United States Patent
Sato et al.

(10) Patent No.: US 9,400,444 B2
(45) Date of Patent: Jul. 26, 2016

(54) IMAGE FORMING APPARATUS WITH IMPROVED TIMING FOR EMITTING BEAM DETECT LIGHT BEAM

(71) Applicant: CANON KABUSHIKI KAISHA, Tokyo (JP)

(72) Inventors: Kazumi Sato, Kashiwa (JP); Hirotaka Seki, Tokyo (JP); Takehiro Ishidate, Tokyo (JP); Yuichiro Imai, Tokyo (JP); Yasuaki Otoguro, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/682,850

(22) Filed: Apr. 9, 2015

(65) Prior Publication Data

US 2015/0293350 A1    Oct. 15, 2015

(30) Foreign Application Priority Data

Apr. 15, 2014 (JP) ................................ 2014-083558

(51) Int. Cl.
*B41J 2/385* (2006.01)
*B41J 2/435* (2006.01)
(Continued)

(52) U.S. Cl.
CPC ............ *G03G 15/043* (2013.01); *G02B 26/121* (2013.01); *G02B 26/127* (2013.01); *G02B 7/1821* (2013.01)

(58) Field of Classification Search
CPC ..... G03G 15/05; G03G 15/06; G03G 15/043; B41J 2/442; B41J 2/47; B41J 2/471; B41J 2/473; B41J 2/45; B41J 29/393; B41J 2/451; G02B 26/123; G02B 26/127; G02B 26/122; G02B 26/121; G02B 26/129; G02B 7/1821

USPC ......... 347/229, 231, 234, 235, 243, 248–250, 347/259–261, 118, 132, 137, 224; 399/46, 399/47, 50, 53, 55, 56, 76; 359/196.1, 359/201.2, 20.1, 216.1
See application file for complete search history.

(56) References Cited

U.S. PATENT DOCUMENTS 5,883,659 A * 3/1999 Serizawa ................. B41J 2/471
                                                    347/260
7,522,326 B1    4/2009 Otoguro ....................... 359/216
(Continued)

FOREIGN PATENT DOCUMENTS

JP            3694164          9/2005
JP      2007078723 A *   3/2007 .............. G02B 26/10

OTHER PUBLICATIONS

U.S. Appl. No. 14/589,762, filed Jan. 5, 2015; Inventors: Daisuke Aruga, Yasuaki Otoguro.
(Continued)

*Primary Examiner* — Jannelle M Lebron
(74) *Attorney, Agent, or Firm* — Fitzpatrick, Cella, Harper & Scinto

(57) ABSTRACT

An image forming apparatus including: a photosensitive member; a charging unit; a light scanning apparatus configured to emit a light beam to scan the photosensitive member to form a latent image; and a developing unit configure to develop the latent image. The light scanning apparatus includes a light source, a rotary polygon mirror, a light receiving unit, and a signal generating unit. An incident timing when the light beam deflected by the polygon mirror enters the light receiving unit after the photosensitive member is charged by the charging unit and after a voltage is applied to a toner carrying member by the developing unit is identified based on the number of second signals generated by the signal generating unit between the first signal and the first signal generated by the light receiving unit before the photosensitive member is charged and before the voltage is applied to the toner carrying member.

13 Claims, 16 Drawing Sheets

(51) Int. Cl.
*H01J 29/70* (2006.01)
*B41J 27/00* (2006.01)
*G02B 26/08* (2006.01)
*G02B 26/12* (2006.01)
*G03G 15/043* (2006.01)
*G02B 7/182* (2006.01)

(56) References Cited

U.S. PATENT DOCUMENTS

| | | | |
|---|---|---|---|
| 7,684,099 B2 | 3/2010 | Otoguro | 359/216.1 |
| 8,947,478 B2 | 2/2015 | Ishidate et al. | 347/137 |
| 2011/0255887 A1* | 10/2011 | Kato | G03G 15/065 399/30 |
| 2013/0169731 A1* | 7/2013 | Mizuta | G02B 26/122 347/224 |
| 2013/0286141 A1* | 10/2013 | Iwamoto | G03G 15/043 347/224 |
| 2015/0029284 A1 | 1/2015 | Otoguro et al. | 347/134 |
| 2015/0042739 A1 | 2/2015 | Seki | 347/118 |

OTHER PUBLICATIONS

U.S. Appl. No. 14/602,912, filed Jan. 22, 2015; Inventors: Takehiro Ishidate, Yasuaki Otoguro.

* cited by examiner

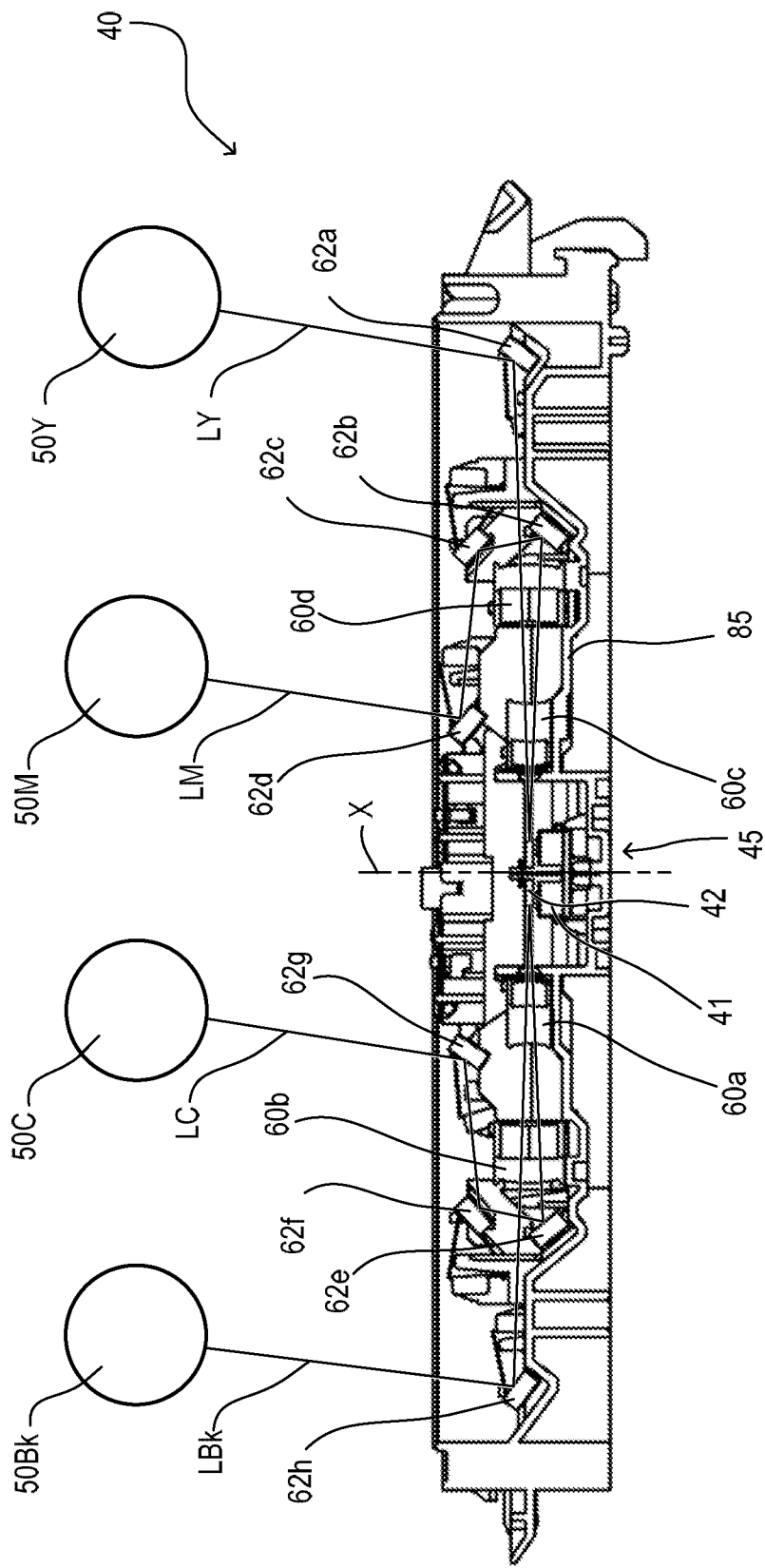

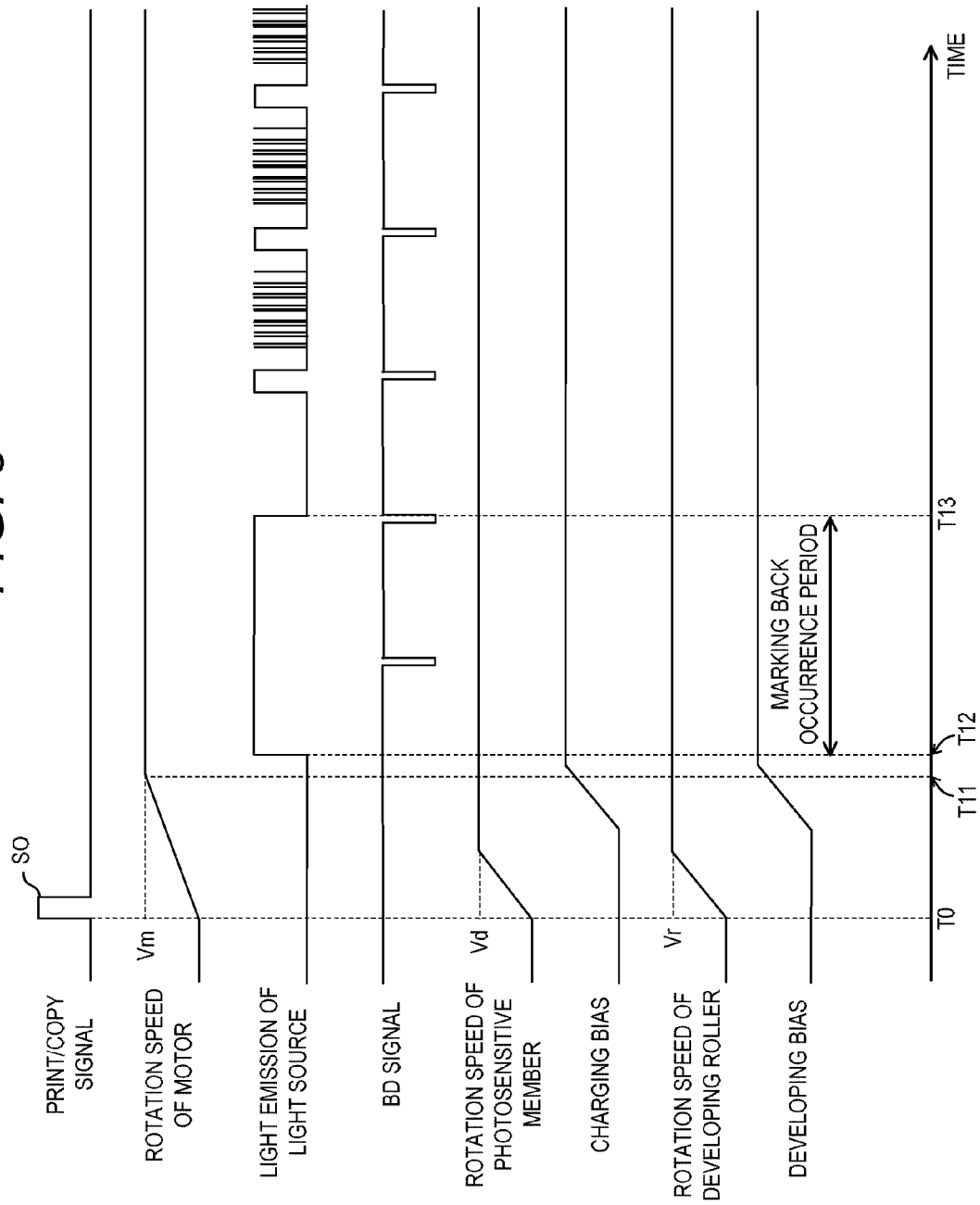

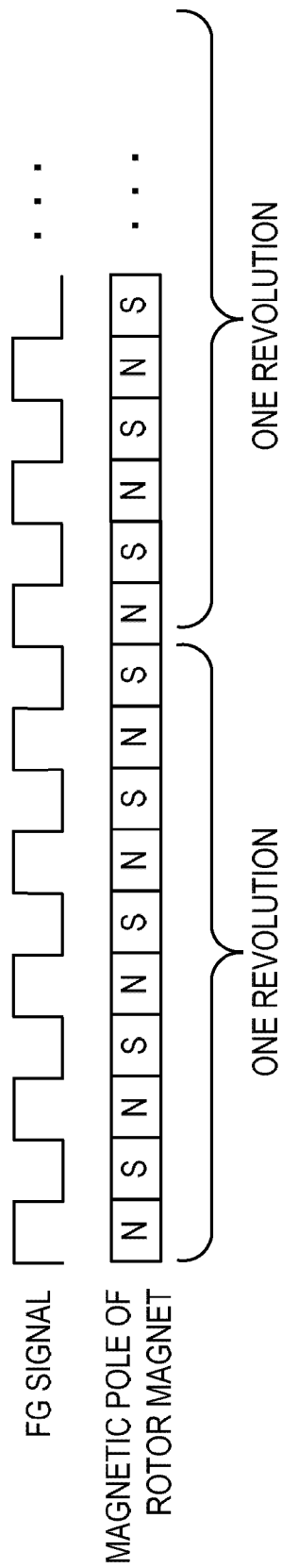

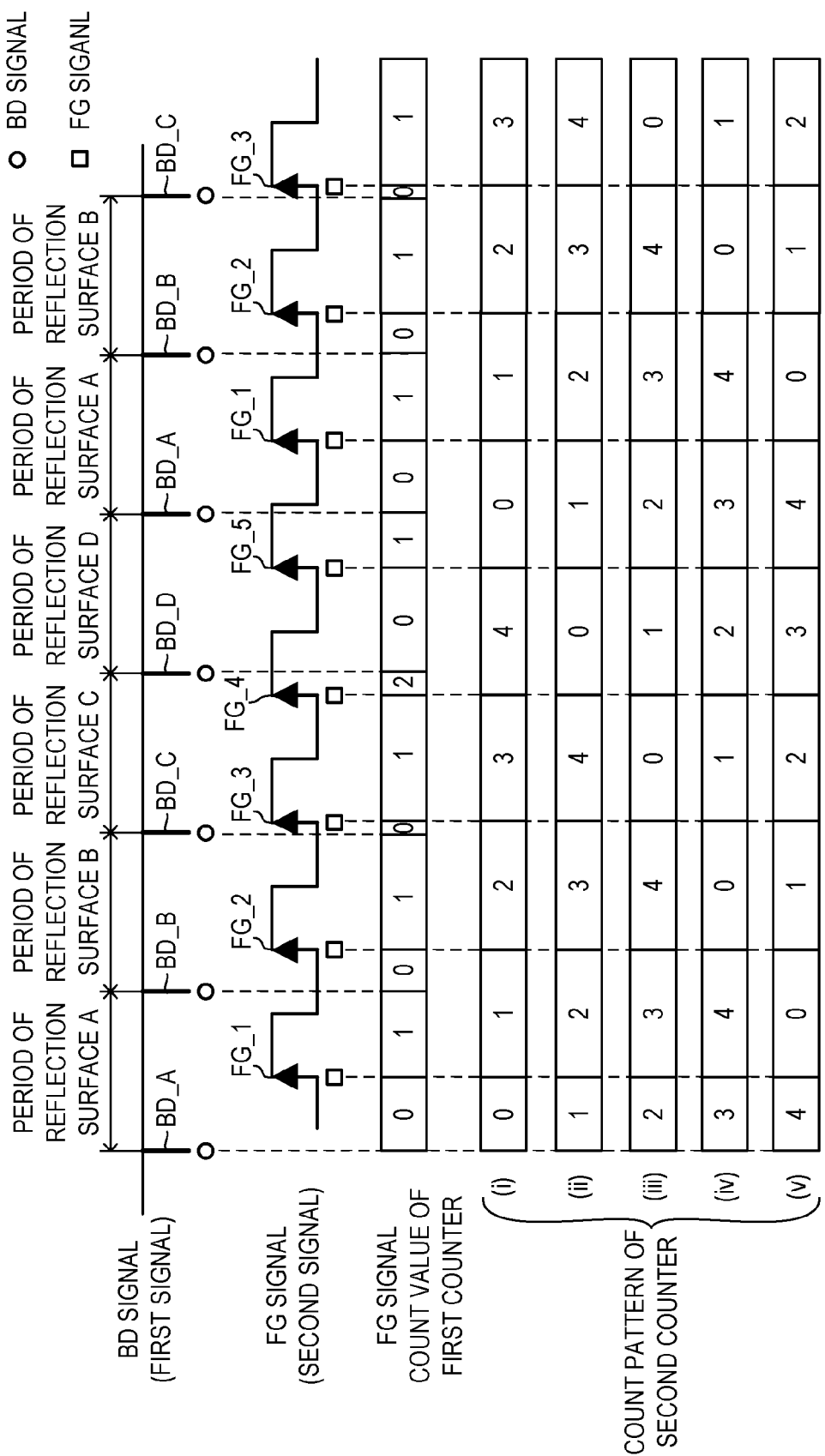

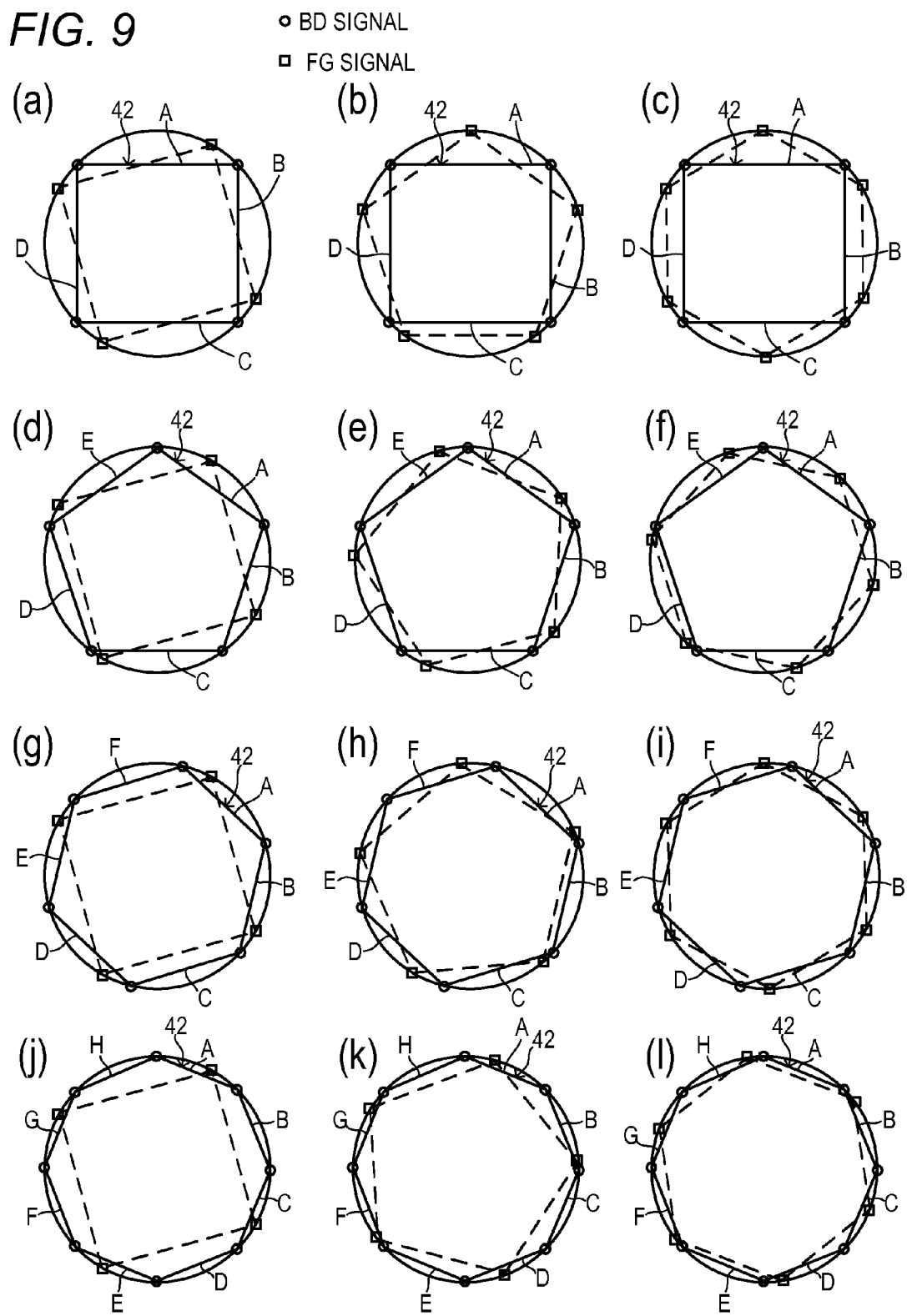

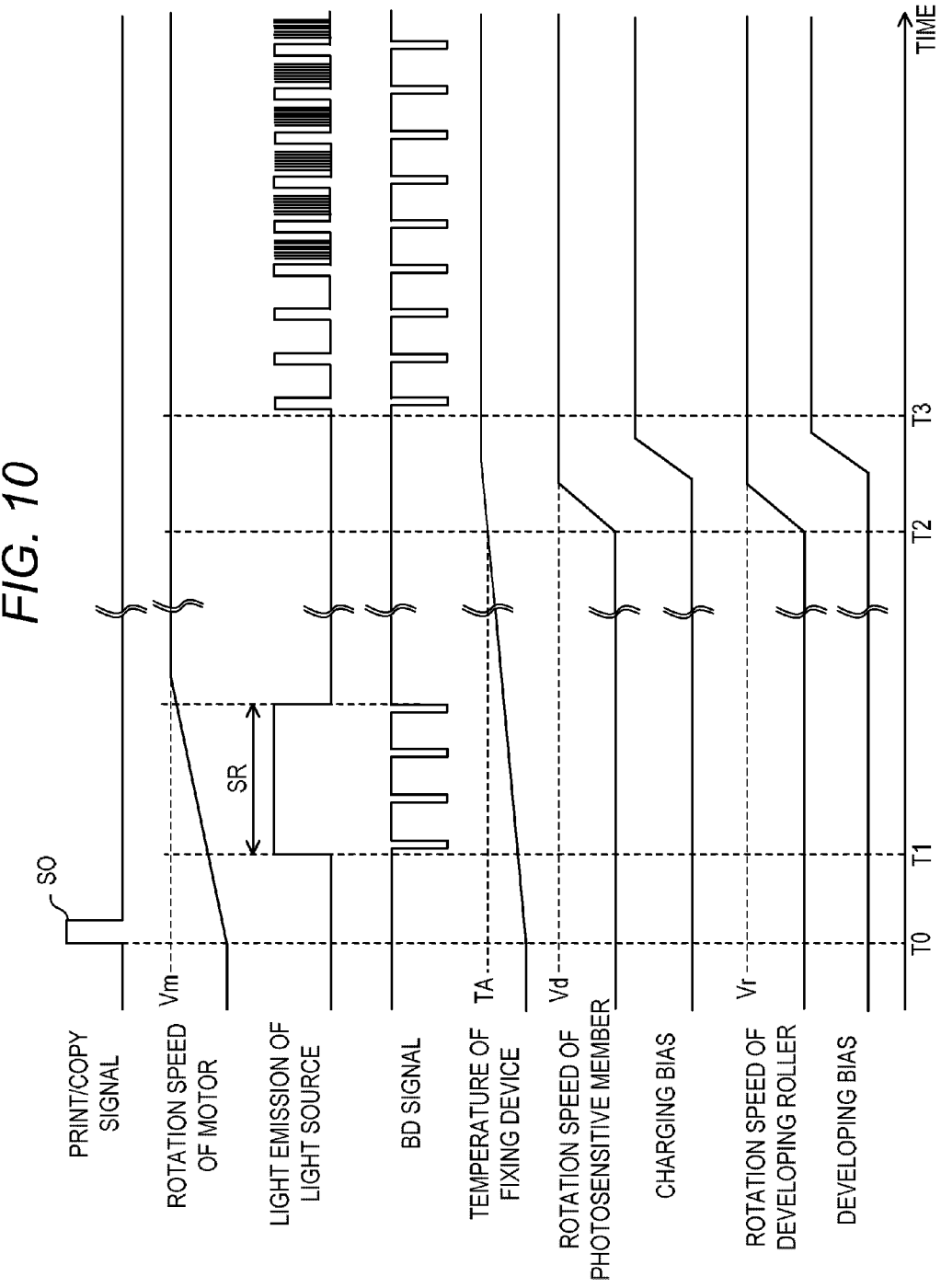

IMAGE FORMING APPARATUS WITH IMPROVED TIMING FOR EMITTING BEAM DETECT LIGHT BEAM

BACKGROUND OF THE INVENTION

1. Field of the Invention

The present invention relates to an image forming apparatus including a light scanning apparatus.

2. Description of the Related Art

Hitherto, an electrophotographic image forming apparatus such as a digital copying machine, a laser beam printer, or a facsimile apparatus includes a light scanning apparatus. The light scanning apparatus scans a surface of a photosensitive member with a light beam to form an electrostatic latent image on the photosensitive member. The light scanning apparatus includes a light-receiving element configured to receive the light beam deflected by a rotary polygon mirror. The light-receiving element generates a synchronous signal by receiving the light beam. The image forming apparatus emits the light beam based on image data with reference to the synchronous signal, to thereby match scan starting positions of the light beam in a scanning direction thereof with one another among respective scans. There is proposed a light scanning apparatus including, in order to determine an emitting timing of the light beam to be entered into the above-mentioned light-receiving element, a detection unit configured to detect a rotation phase of the rotary polygon mirror and output a rotation phase signal.

The detection unit includes a mark formed on a rotor flange to which the rotary polygon mirror is fixed by a pressing force of a spring, and a sensor configured to irradiate the mark with light and detect the reflected light. The sensor is configured to generate a detection signal indicating that the mark has been detected when the rotor flange is rotated to cause the mark to reach a detection area of the sensor. During pre-rotation processing at a time of warm-up, the CPU uses an internal counter of the CPU to measure a time period tp from a detection signal of the sensor up to the synchronous signal of the light-receiving element, and stores the time period tp in a memory. Note that, even when the light beam is emitted in order to obtain the synchronous signal from a beam detector during the pre-rotation processing at the time of the warm-up, marking back does not occur on a recording medium because an image is not being formed. At normal image formation, in a state in which a speed of the rotary polygon mirror is constant, after a time period (tp−α) has elapsed from an initial rotational position signal, the light beam is emitted from a light source to generate the synchronous signal by the beam detector. Here, α is an allowance estimated as a time period in which the light beam does not reach the photosensitive member while synchronization is positively enabled in consideration of an effective scanning periodic ratio. In this manner, the light beam for generating the synchronous signal is emitted at a timing that does not affect exposure of the photosensitive member, and hence a light emitting timing of the light beam for generating the synchronous signal can be determined without causing the marking back to occur on the recording medium (Japanese Patent No. 3,694,164).

However, according to Japanese Patent No. 3,694,164, in order to detect a rotational position of the rotary polygon mirror, the mark formed on the rotor flange and a light reflection sensor configured to detect the reflected light from the mark need to be separately provided within the light scanning apparatus. This may increase the number of parts that form the light scanning apparatus, and causes an increase in cost.

SUMMARY OF THE INVENTION

Therefore, the present invention provides an image forming apparatus, which identifies a reflection surface of a rotary polygon mirror without causing marking back to occur on a recording medium.

According to one embodiment of the present invention, there is provided an image forming apparatus, comprising:

a photosensitive member;

a charging unit configured to charge the photosensitive member;

a light scanning apparatus configured to emit a light beam to the photosensitive member to form an electrostatic latent image on the photosensitive member charged by the charging unit, the light scanning apparatus including:

a light source configured to emit the light beam;

a rotary polygon mirror comprising a plurality of reflection surfaces configured to deflect the light beam emitted from the light source so that the light beam scans the photosensitive member;

a light receiving unit arranged on a scanning route of the light beam in such a position as to receive the light beam that is emitted from the light source during a period other than a period during which the photosensitive member is scanned, and is deflected by the plurality of reflection surfaces, the light receiving unit being configured to generate a first signal for determining an emitting timing of the light beam based on image data in a scanning period of the light beam; and a drive unit comprising:

a motor configured to rotate the rotary polygon mirror; and a signal generating unit configured to generate a plurality of second signals in accordance with a rotation phase during one revolution of the rotary polygon mirror, a number of the plurality of second signals being different from a number of first signals generated during one revolution of the rotary polygon mirror, each of the plurality of second signals being generated between the respective first signals generated during one revolution of the rotary polygon mirror;

a developing unit configured to develop, by using toner, the electrostatic latent image formed on the photosensitive member by the light beam scanning the photosensitive member, the developing unit comprising a toner carrying member configured to carry the toner, the developing unit being configured to apply a voltage for developing the electrostatic latent image to the toner carrying member;

a storage unit configured to store phase difference information between each of the first signals and a corresponding one of the plurality of second signals during one revolution of the rotary polygon mirror; and a control unit configured to control the light scanning apparatus, the charging unit, and the developing unit, the control unit being configured to identify, based on the phase difference information and the number of the plurality of second signals generated between the first signal and the first signal that are generated by rotating the rotary polygon mirror and emitting the light beam from the light source before the photosensitive member is charged by the charging unit and before the voltage is applied to the toner carrying member by the developing unit, an incident timing when the light beam deflected by the plurality of reflection surfaces enters the light receiving unit after the charging unit starts charging the photosensitive member and after the developing unit starts applying the voltage to the toner carrying member.

Further features of the present invention will become apparent from the following description of exemplary embodiments with reference to the attached drawings.

BRIEF DESCRIPTION OF THE DRAWINGS

FIG. 2A is a sectional view of a light scanning apparatus according to the embodiment.

FIG. 3 is a timing chart of a BD search according to a comparative example.

FIG. 5C is a diagram illustrating a relationship between an arrangement of magnetic poles of a rotor magnet and an FG signal.

FIG. 7B is a timing chart illustrating a relationship between the BD signal and the FG signal.

FIG. 9 is a diagram illustrating a relationship between a number of reflection surfaces and a number of FG signals according to the embodiment.

FIG. 10 is a timing chart of the reflection surface identifying sequence according to the embodiment.

DESCRIPTION OF THE EMBODIMENTS

Now, an embodiment for carrying out the present invention will be described.

[Image Forming Apparatus]

Figure 1:
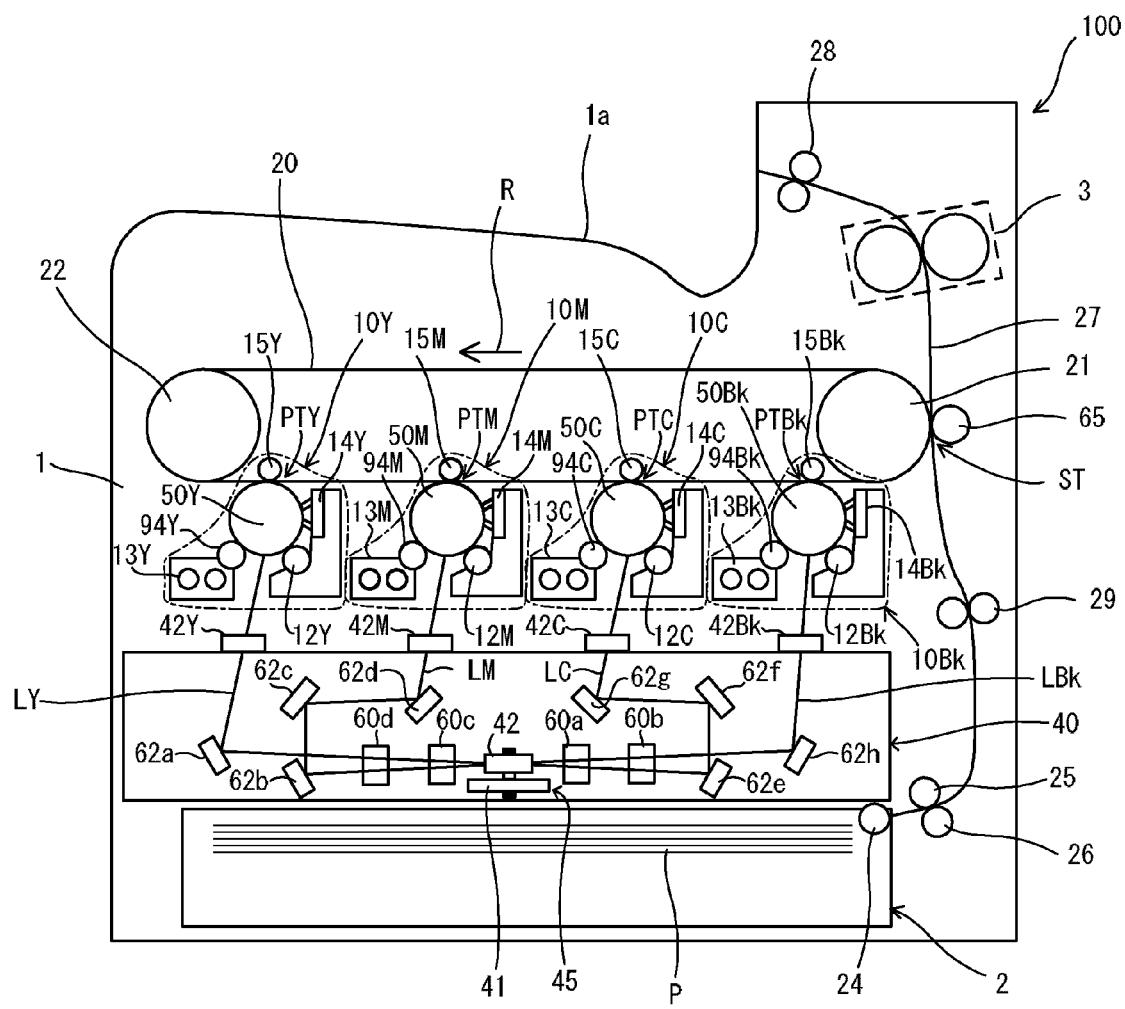
FIG. 1 is a sectional view of an image forming apparatus according to an embodiment.

An electrophotographic image forming apparatus (hereinafter referred to as "image forming apparatus") 100 according to the embodiment will be described. FIG. 1 is a sectional view of the image forming apparatus 100. As an example of the image forming apparatus 100, a tandem-type color laser beam printer is illustrated. The image forming apparatus 100 is configured to form an image on a recording medium (hereinafter referred to as "sheet") P using an electrophotographic method. The image forming apparatus 100 includes four image forming portions 10 (10Y, 10M, 10C, 10Bk). The suffixes Y, M, C, and Bk of the reference symbols indicate yellow, magenta, cyan, and black, respectively. In the following description, the suffixes Y, M, C, and Bk may be omitted.

The image forming portions 10 each include a photosensitive drum serving as an image bearing member (hereinafter referred to as "photosensitive member") 50 (50Y, 50M, 50C, 50Bk). A process unit configured to act on the photosensitive member 50 is arranged around each of the photosensitive member 50. Specifically, a charging roller (charging unit) 12 (12Y, 12M, 12C, 12Bk), a developing device (developing unit) 13 (13Y, 13M, 13C, 13Bk), and a primary transfer roller (primary transfer member) 15 (15Y, 15M, 15C, 15Bk) are arranged around the photosensitive member 50. A light scanning apparatus (exposure apparatus) 40 is arranged below the four image forming portions 10.

The charging roller (charging member) 12 is applied with a charging bias, to thereby uniformly charge a surface of the photosensitive member 50. The developing device 13 includes a developing roller (developer carrying member or toner carrying member) 94 (94Y, 94M, 94C, 94Bk) configured to carry developer (toner) of each color. The developing roller 94 is applied with a developing bias, to thereby develop an electrostatic latent image on the surface of the photosensitive member 50 with the toner to obtain a toner image.

The image forming apparatus 100 includes an intermediate transfer belt (intermediate transfer member) onto which toner images of a plurality of colors are primarily transferred from the respective image forming portions 10. The intermediate transfer belt 20 is arranged above the four image forming portions 10. The intermediate transfer belt 20 is an endless belt that is wound around a pair of belt conveyance rollers 21 and 22. The intermediate transfer belt 20 is rotated in a direction indicated by the arrow R.

The primary transfer roller 15 is arranged so as to face the photosensitive member 50 of the image forming portion 10 across the intermediate transfer belt 20. The primary transfer roller 15 forms a primary transfer portion PT (PTY, PTM, PTC, PTBk) between the intermediate transfer belt 20 and the photosensitive member 50. Through application of a transfer voltage to the primary transfer roller 15, the toner image on the photosensitive member 50 is primarily transferred onto the intermediate transfer belt 20.

The four image forming portions 10Y, 10M, 10C, and 10Bk are arranged in line below the intermediate transfer belt 20. Along the rotational direction R of the intermediate transfer belt 20, the yellow image forming portion 10Y, the magenta image forming portion 10M, the cyan image forming portion 10C, and the black image forming portion 10Bk are arranged in the stated order. The image forming portions 10 form a yellow toner image, a magenta toner image, a cyan toner image, and a black toner image with the toners of the respective colors.

A secondary transfer roller 65 is arranged so as to face the belt conveyance roller 21 across the intermediate transfer belt 20, to thereby form a secondary transfer portion ST between the intermediate transfer belt 20 and the secondary transfer roller 60.

A sheet feeding cassette 2 configured to receive the sheets P is provided at a lower portion of a main body 1 of the image forming apparatus 100. The sheet feeding cassette 2 is removably mounted to the lower portion of the main body 1 from a side surface of the main body 1. A pickup roller 24 and a feed roller 25 are provided above the sheet feeding cassette 2. The pickup roller 24 and the feed roller 25 are configured to feed the sheets P received in the sheet feeding cassette 2 one by one. A retard roller 26 is arranged so as to face the feed roller 25 in order to prevent a multifeed of the sheets P.

A conveyance route 27 of the sheet P in an interior of the main body 1 is formed so as to be substantially vertical along a right side surface of the main body 1 illustrated in FIG. 1. A registration roller pair 29, the secondary transfer portion ST, a fixing device 3, and a delivery roller 28 are provided in the conveyance route 27.

[Image Forming Process]

Now, an image forming process in the image forming apparatus 100 will be described. The charging roller 12 uniformly charges a surface of the photosensitive member 50. The light scanning apparatus 40 exposes the uniformly charged surface of the photosensitive member 50 to laser light (hereinafter referred to as "light beam") L (LY, LM, LC, LBk), which is modulated based on image information (image data) of each color. With this, an electrostatic latent image is formed on the surface of the photosensitive member 50. The developing device 13 develops the electrostatic latent image with the toner of each color, to thereby form the toner image of each color on the photosensitive member 50. The toner images of the four colors formed by the four image forming portions 10 are primarily transferred by the primary transfer rollers 15 onto the intermediate transfer belt 20 rotated in the rotational direction R, and are then superimposed on the intermediate transfer belt 20. The toner (transfer residual toner) remaining on the photosensitive member 50 after the primary transfer is collected by a cleaning device 14 (14Y, 14M, 14C, 14Bk).

On the other hand, the sheet P is fed to the registration roller pair 29 from the sheet feeding cassette 2 by the pickup roller 24 and the feed roller 25. The registration roller pair 29 conveys the sheet P to the secondary transfer portion ST between the secondary transfer roller 65 and the intermediate transfer belt 20 in synchronization with the toner images superimposed on the intermediate transfer belt 20.

The toner images superimposed on the intermediate transfer belt 20 are secondarily transferred onto the sheet P collectively in the secondary transfer portion ST. The toner remaining on the intermediate transfer belt 20 without being transferred onto the sheet P during the second transfer is collected by a cleaning mechanism (not shown) of the intermediate transfer belt 20. The sheet P having the toner image transferred thereon is conveyed to the fixing device 3 arranged upstream of the secondary transfer portion ST along the conveyance route 27.

The fixing device 3 heats and pressurizes the sheet P, to thereby fix the toner images onto the sheet P. In this manner, a full-color image is formed on the sheet P. The sheet P having the full-color image formed thereon is delivered onto a delivery tray 1a provided at an upper portion of the main body 1 by the delivery roller pair 28.

[Configuration of Light Scanning Apparatus]

As described above, in a case of forming the full-color image by the image forming apparatus 100, the light scanning apparatus 40 is configured to expose the photosensitive members 50Y, 50M, 50C, and 50Bk of the respective image forming portions 10 to the light beams at respective predetermined timings based on the image information pieces of the respective colors. With this, the toner images of the respective colors are formed on the photosensitive members 50 based on the image information pieces of the respective colors. In order to obtain the full-color image with high quality, positions of the electrostatic latent images formed by the light scanning apparatus 40 need to be reproducibly aligned with high accuracy. In the embodiment, the light scanning apparatus 40 is shared by the four image forming portions 10Y, 10M, 10C, and 10Bk.

Figure 2B:
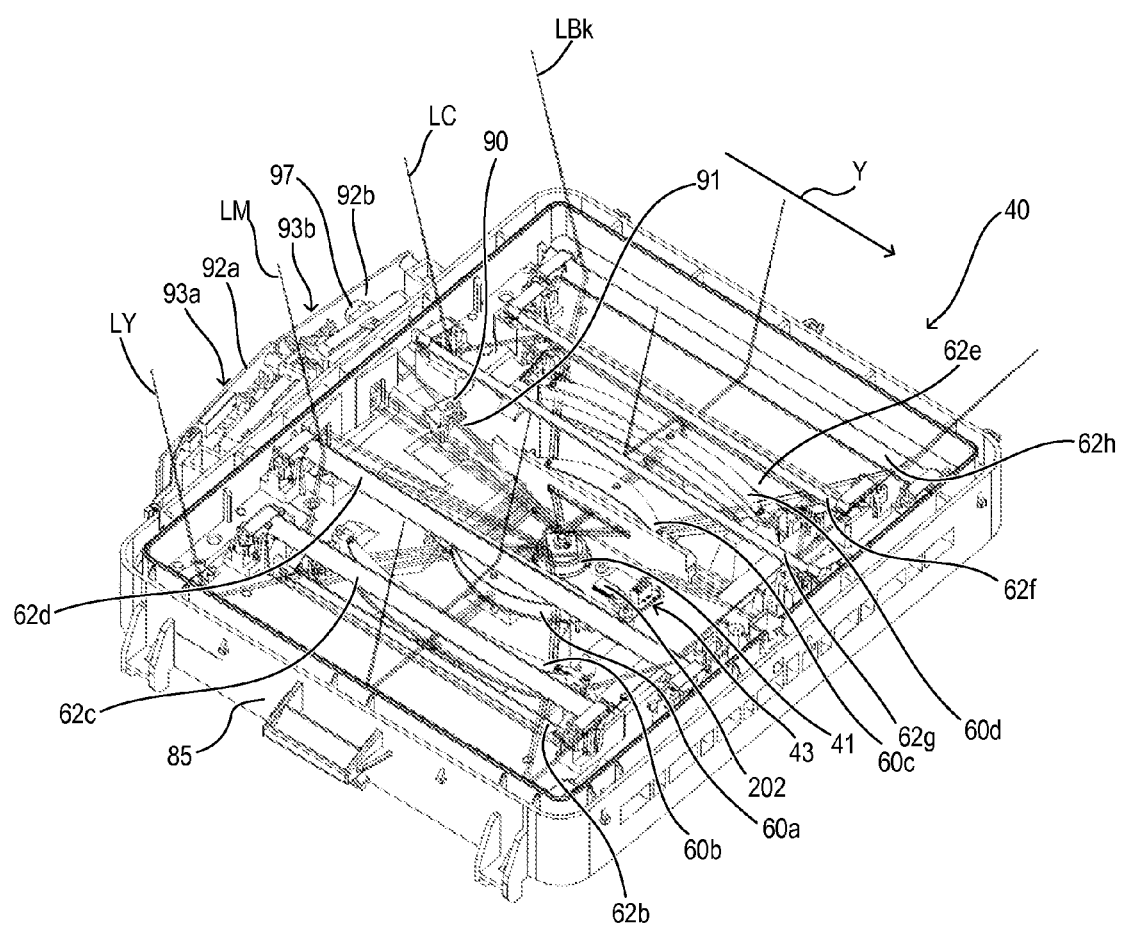
FIG. 2B is a perspective view of the light scanning apparatus when viewed from a side thereof opposite to a light source unit.
Figure 2C:
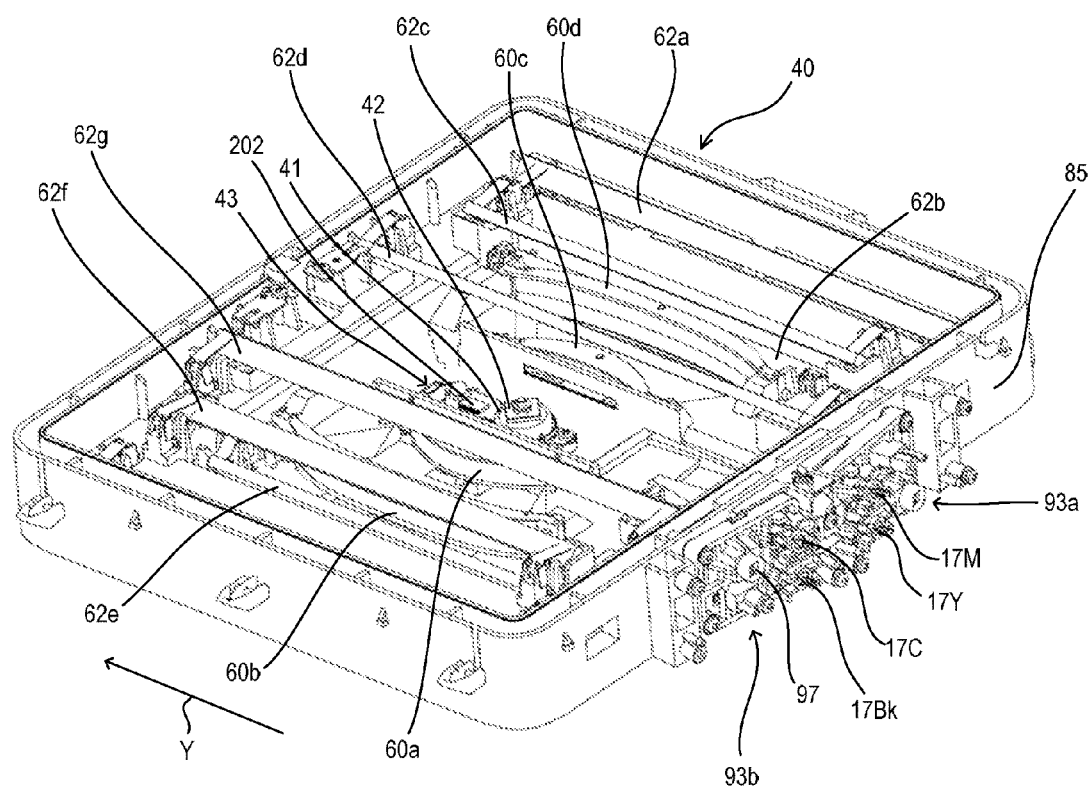
FIG. 2C is a perspective view of the light scanning apparatus when viewed from a side thereof on which the light source unit is provided.

FIG. 2A is a vertical sectional view of the light scanning apparatus 40 according to the embodiment. FIG. 2B is a perspective view of the light scanning apparatus 40 when viewed from a side thereof opposite to a light source unit 93 (93a, 93b). FIG. 2C is a perspective view of the light scanning apparatus 40 when viewed from a side thereof on which the light source unit 93 is provided. With reference to FIG. 1, FIG. 2A, FIG. 2B, and FIG. 2C, the light scanning apparatus 40 according to the embodiment will be described below.

The light scanning apparatus 40 includes an optical box (hereinafter referred to as "housing") 85. The housing 85 includes the light source unit 93 (93a, 93b), a rotary polygon mirror 42, a lens 60 (60a, 60b, 60c, 60d), and a reflective mirror 62 (62a, 62b, 62c, 62d, 62e, 62f, 62g, 62h). The light scanning apparatus 40 includes four semiconductor lasers (hereinafter referred to as "light sources") 17 (17Y, 17M, 17C, 17Bk) each configured to emit a light beam modulated based on image information on each color. The light source unit 93a holds the light source 17Y configured to emit a light beam LY modulated based on the image information on yellow and the light source 17M configured to emit a light beam LM modulated based on the image information on magenta. The light source unit 93b holds the light source 17C configured to emit a light beam LC modulated based on the image information on cyan and the light source 17Bk configured to emit a light beam LBk modulated based on the image information on black.

The light scanning apparatus 40 includes a deflecting unit (deflector) 45 configured to deflect a light beam L in a central part of the housing 85. The deflecting unit 45 includes the rotary polygon mirror 42, a motor 41 configured to rotate the rotary polygon mirror 42, and a circuit board 43 configured to drive the motor 41. The light beam L emitted from the light source 17 is emitted toward the rotary polygon mirror 42. The light beam L is deflected by the rotary polygon mirror 42 being rotated. The light beam L deflected by the rotary polygon mirror 42 is guided by optical members such as the lens 60 and the reflective mirror 62 installed inside the light scanning apparatus 40 so as to be introduced to the photosensitive member 50. The light beam L scans the surface of the photosensitive member 50 along a main-scanning direction (direction of a rotation axis of the photosensitive member 50) indicated by the arrow Y in FIG. 2B.

Now, an optical path of each of the light beams LBk, LC, LM, and LY will be described. The light beam LY emitted from the light source 17Y corresponding to the photosensitive member 50Y is deflected by the rotary polygon mirror 42, and enters the lens 60c. The light beam LY that has passed through the lens 60c enters the lens 60d, passes through the lens 60d, and is then reflected by the reflective mirror 62a. The light beam LY reflected by the reflective mirror 62a passes through a transparent window 42Y, to thereby scan the photosensitive member 50Y.

The light beam LM emitted from the light source 17M corresponding to the photosensitive member 50M is deflected by the rotary polygon mirror 42, and enters the lens 60c. The light beam LM that has passed through the lens 60c enters the lens 60d, passes through the lens 60d, and is then reflected by the reflective mirror 62b, the reflective mirror 62c, and the reflective mirror 62d. The light beam LM reflected by the reflective mirror 62d passes through a transparent window 42M, to thereby scan the photosensitive member 50M.

The light beam LC emitted from the light source 17C corresponding to the photosensitive member 50C is deflected by the rotary polygon mirror 42, and enters the lens 60a. The light beam LC that has passed through the lens 60a enters the lens 60b, passes through the lens 60b, and is then reflected by the reflective mirror 62e, the reflective mirror 62f, and the reflective mirror 62g. The light beam LC reflected by the reflective mirror 62g passes through a transparent window 42C, to thereby scan the photosensitive member 50C.

The light beam LBk emitted from the light source 17Bk corresponding to the photosensitive member 50Bk is deflected by the rotary polygon mirror 42, and enters the lens 60a. The light beam LBk that has passed through the lens 60a enters the lens 60b, passes through the lens 60b, and is then reflected by the reflective mirror 62h. The light beam LBk reflected by the reflective mirror 62h passes through a transparent window 42Bk, to thereby scan the photosensitive member 50Bk.

[BD]

The light scanning apparatus 40 includes a beam detector (hereinafter referred to as "BD") 97 configured to generate a synchronous signal (hereinafter referred to as "BD signal") in a main-scanning direction Y in order to maintain the same image writing start position on the photosensitive member 50 during each scan of the light beam L. The BD (light receiving unit) 97 is provided on a light source control substrate 92b of the light source unit 93b. The BD 97 is arranged on an image writing side of the main-scanning direction Y of the light beam LBk. In the embodiment, the BD 97 receives the light beam LBk deflected by a reflection surface of the rotary polygon mirror 42, and generates a BD signal (first signal) indicating an image writing position in the main-scanning direction Y of the light beam LBk with respect to the photosensitive member 50. The light beam LBk deflected by the rotary polygon mirror 42 passes through an optical path 91 at an edge part of the image writing side in the main-scanning direction Y, and is imaged on the BD 97 by a BD lens 90. When the light beam LBk passes over the BD 97, the BD signal is output from the BD 97. A CPU (control device) 600 described later determines, based on the BD signal, a timing when, in other words, a position (scan starting position) where the writing of the electrostatic latent image on the photosensitive member 50Bk is started by the light beam LBk for each reflection surface of the rotary polygon mirror 42. Therefore, at a time of image formation, the light source 17Bk needs to be turned on at an incident timing when the light beam LBk enters the BD 97 for each scan.

Note that, the CPU 600 also determines timings when the image writing is started by the light beams LY, LM, and LC based on the BD signal of the light beam LBk. However, a BD may be provided to each of the light beams LY, LM, and LC. Alternatively, one BD may be provided to the light beams LY and LM, while another BD may be provided to the light beams LC and LBk.

BD Search as Comparative Example

In order to obtain the BD signal from the BD 97, the light beam L is emitted from the light source 17. However, unnecessary emission of the light beam L causes flare light to occur inside the light scanning apparatus 40. The flare light causes image degradation. Therefore, a lighting-up period of time during which the light source 17 is kept on in order to obtain the BD signal needs to be set as short as possible. In order to shorten the lighting-up period of time during which the light source 17 is kept on, it suffices that the light source 17 is turned on at a timing when the light beam L passes over the BD 97. To that end, it is necessary to identify the timing when the CPU 600 turns on the light source 17. Once the BD signal is obtained after the light beam L emitted from the light source 17 passes over the BD 97, a lighting-up timing of the light source 17 can be held as long as the motor 41 is steadily rotated with a constant speed. However, once the motor 41 is stopped, it is necessary to obtain the lighting-up timing of the light source 17 again. A comparative example for obtaining the lighting-up timing of the light source 17 for generating the BD signal will be described below.

In general, when the rotation of the stopped motor 41 is started, the image forming apparatus conducts a synchronization detection identifying sequence (hereinafter referred to as "BD search") in order to determine the lighting-up timing of the light beam L to be entered to the BD 97. In the related-art BD search, first, the motor 41 is steadily rotated with a predetermined rotation speed for image formation. The light source 17 is turned on in a state in which the motor 41 is being steadily rotated with the predetermined rotation speed, and is kept on until the BD signal is output from the BD 97. When the BD signal is detected, the light source 17 is turned off. The light source 17 is turned on after a predetermined time period has elapsed since the BD signal is detected, and when the BD signal is detected again, the light source 17 is turned off. The turning on and off of the light source 17 are controlled at such a timing, to thereby be able to obtain the BD signal for each scan.

The BD search is conducted, for example, before the image is written for the image formation on the first sheet during one job. The image writing start position in an axis direction (main-scanning direction Y) of the photosensitive drum 50 can be obtained from a rotational position of the rotary polygon mirror 42 at a time point when the BD signal is detected. For example, after the predetermined time period obtained in advance has elapsed since the BD signal is detected, when the emission of the light beam L modulated based on the image information is started, the same image writing start position on the photosensitive member 50 can be maintained during each scan. As long as the rotary polygon mirror 42 is being steadily rotated with the predetermined rotation speed, it is possible to constantly grasp the rotational position of the rotary polygon mirror 42 based on the BD signal. By controlling a motor drive portion 202 based on the BD signal, it is possible to maintain the same image writing start position during each scan.

Incidentally, in the BD search according to the comparative example, the light beam is emitted while the light source 17 is kept on in order to obtain the first BD signal after rotation start of the motor 41, and hence the surface of the photosensitive member 50 is exposed to the light beam by one scanning line at maximum. Such exposure of the photosensitive member 50 causes degradation of the photosensitive member 50 and unnecessary formation of a toner image. The unnecessary formation of the toner image increases toner consumption. Further, the unnecessary formation of the toner image may cause marking back to occur on the sheet P. Now, an occurrence mechanism of the marking back due to the BD search according to the comparative example will be described.

[Marking-Back Occurrence Mechanism Due to BD Search According to Comparative Example]

Now, with reference to FIG. 3 and FIGS. 4A, 4B, 4C, 4D, 4E, and 4F, a marking-back occurrence mechanism for the sheet P due to the BD search according to the comparative example will be described. FIG. 3 is a timing chart of the BD search according to the comparative example. FIGS. 4A to 4F are schematic diagrams illustrating a process in which the marking back occurs.

In FIG. 3, the user generates a print/copy signal S0 that causes the image forming apparatus 100 to start printing or copying (time T0). When the rotation speed of the photosensitive member 50 reaches a predetermined rotation speed Vd for image formation, the charging bias is applied to the charging roller 12. Further, when a rotation speed of the developing roller 94 reaches a predetermined rotation speed Vr for image formation, the developing bias is applied to the developing roller 94. When a rotation speed of the motor 41 reaches a predetermined rotation speed Vm of a rotation speed for optical writing (time T11), the photosensitive member 50 and the developing roller 94 are being stably rotated with the predetermined rotation speeds Vd and Vr, and the charging bias and the developing bias are applied thereto, respectively.

In the state in which the motor 41 is stably rotated with the predetermined rotation speed Vm, the light source 17 is turned on (time T12). The light source 17 maintains its turned-on state until the BD signal is output from the BD 97. In this example, the turned-on state of the light source 17 is maintained until the BD signal has been output twice (time T13). In order to prevent erroneous detection due to noise or the like, it is general that the turned-on state of the light source 17 is maintained until the BD signal is output a plurality of times.

Here, a period during which the light source 17 is kept on from the time T12 to the time T13 illustrated in FIG. 3 corresponds to a marking-back occurrence period. During the marking-back occurrence period, the photosensitive member 50 and the developing roller 94 is being stably rotated with the predetermined rotation speeds Vd and Vr, and the charging bias and the developing bias are applied to the charging roller 12 and the developing roller 94, respectively. Accordingly, the surface of the rotated photosensitive member 50 is charged by the charging roller 12. The charged surface of the photosensitive member 50 is exposed to the light beam L from the light source 17 for the BD search, and the latent image is formed on the photosensitive member 50. The developing bias is applied to the developing roller 94 as well, and hence the latent image is developed by the developing device 13 into the toner image with the toner.

Figure 4A:
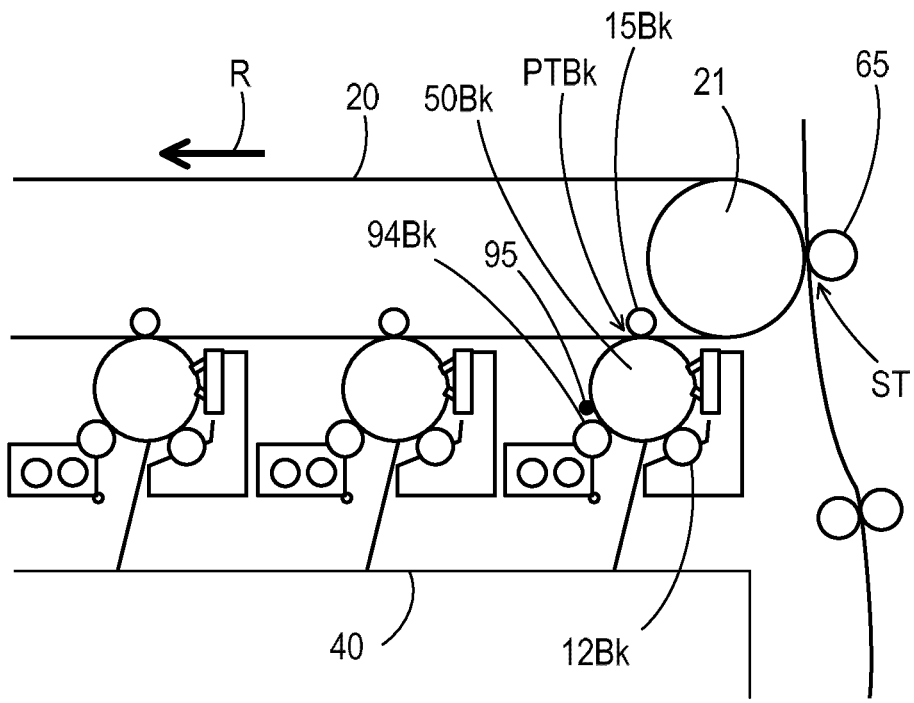
FIGS. 4A, 4B, 4C, 4D, 4E, and 4F are schematic diagrams illustrating a process in which marking back occurs.
Figure 4B:
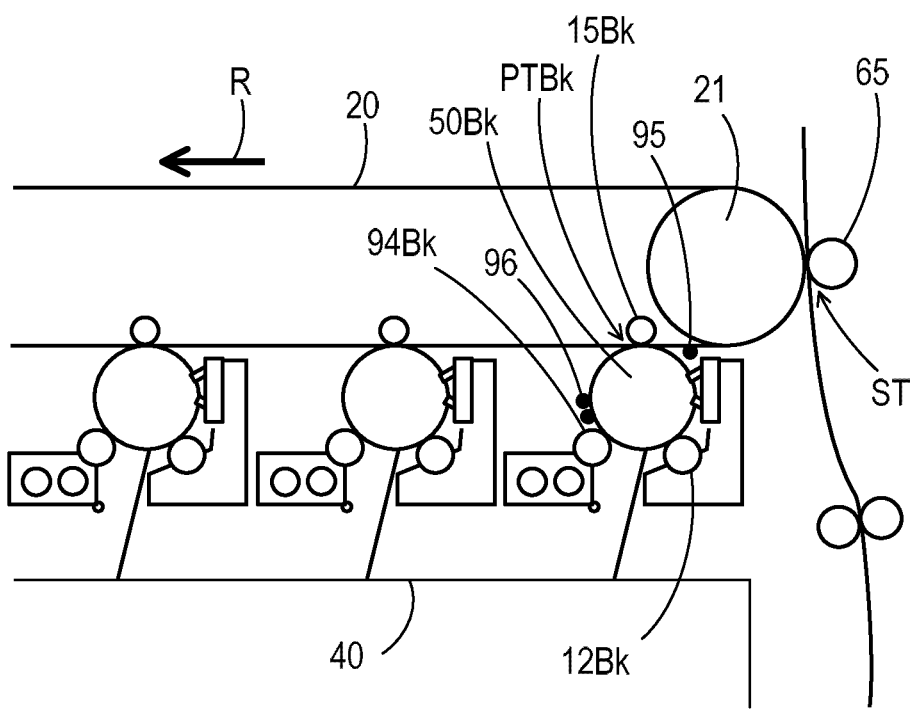
Figure 4C:
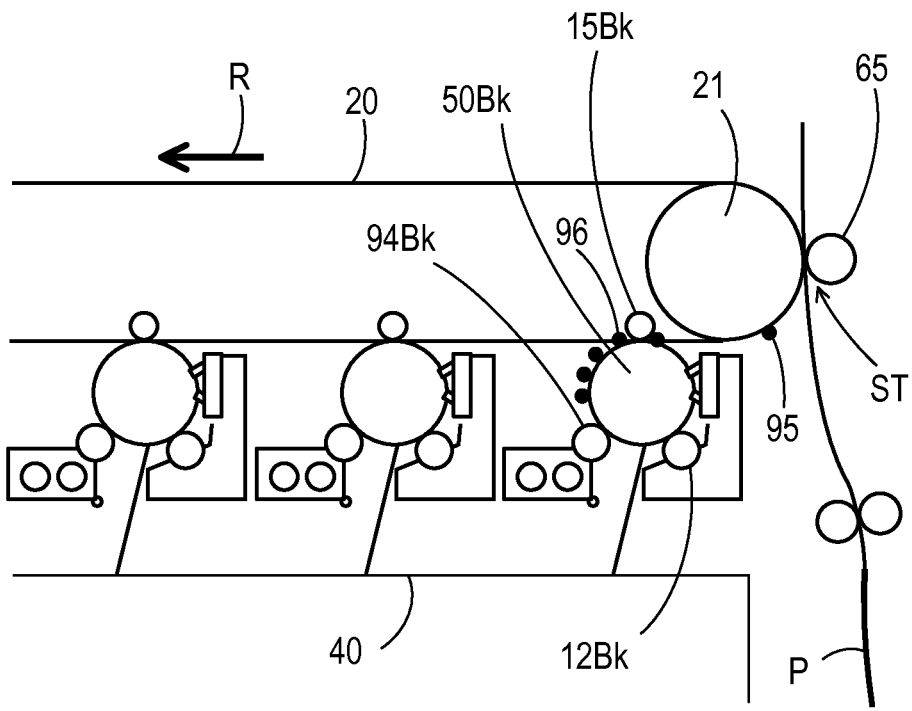
Figure 4D:
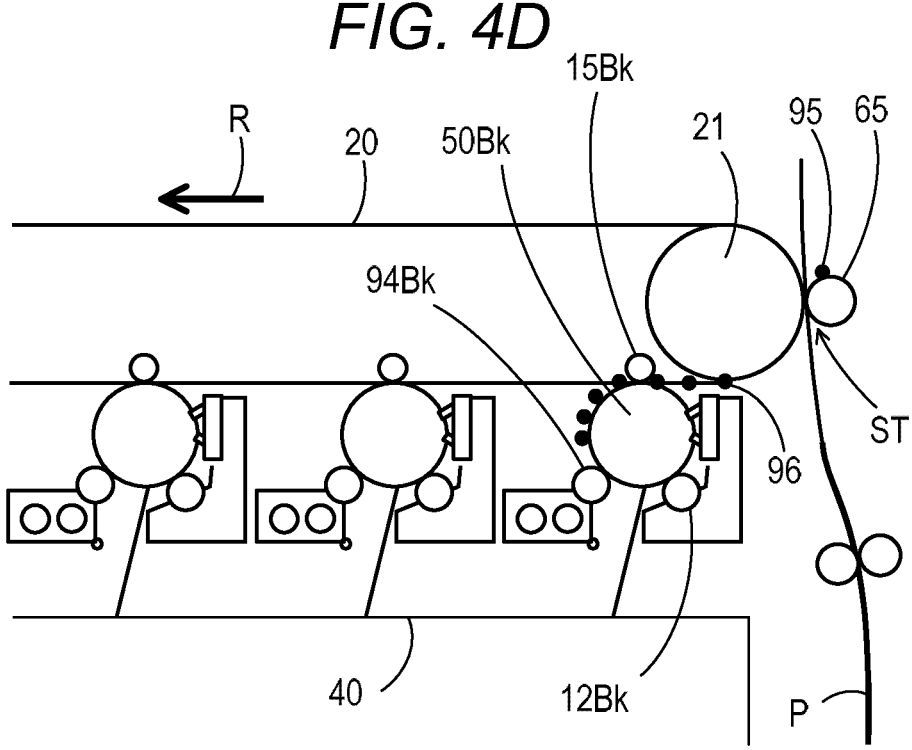
Figure 4E:
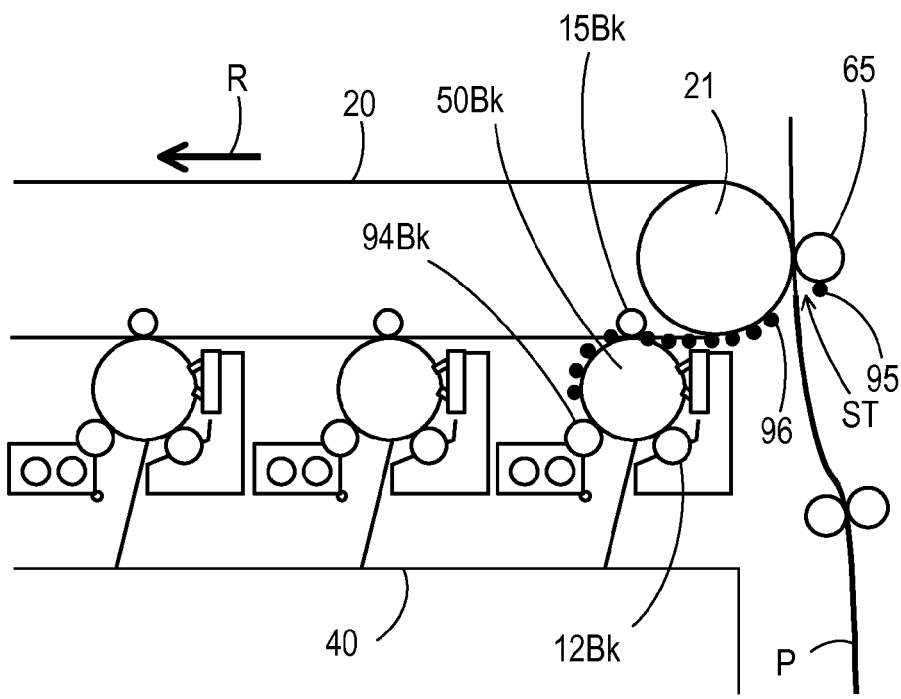
Figure 4F:
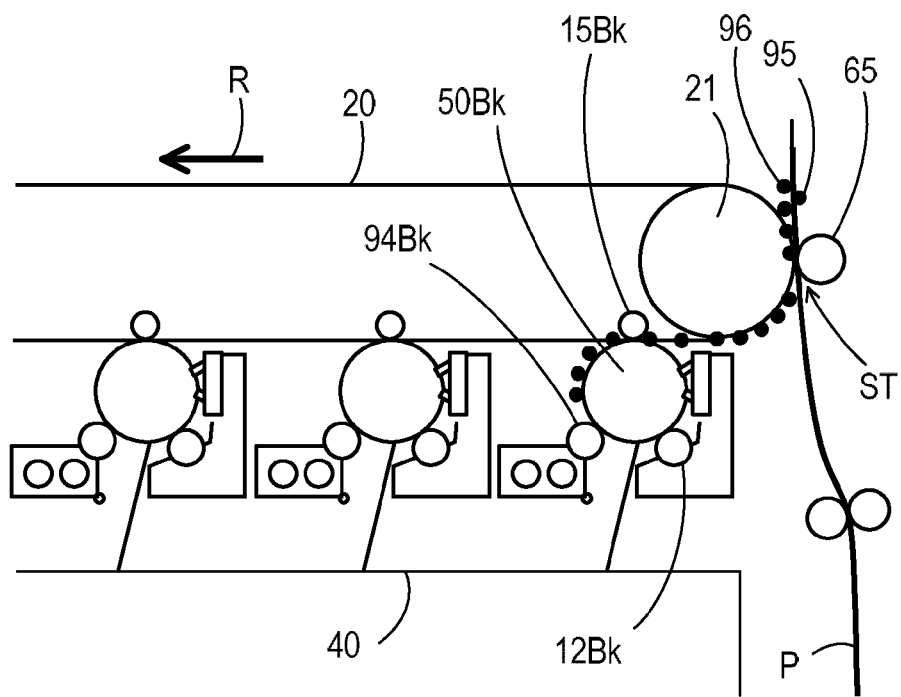

In particular, as in this example, when the light beam L reflected by the rotary polygon mirror 42 reaches the photosensitive member 50 a plurality of times to form a plurality of linear latent images extending in the main-scanning direction Y on the photosensitive member 50, the plurality of linear latent images are likely to be developed due to an edge effect or the like. FIG. 4A illustrates a state where, at this time, toner 95 adheres onto the photosensitive member 50Bk. The toner 95 (hereinafter referred to as "marking back toner") to become the marking back in the subsequent stage adheres onto the photosensitive member 50Bk. The marking back toner 95 on the photosensitive member 50Bk is carried to a primary transfer portion PTBk by the rotation of the photosensitive member 50Bk. A predetermined primary transfer bias is applied to the primary transfer roller 15Bk, and as illustrated in FIG. 4B, the marking back toner 95 on the photosensitive member 50Bk is transferred onto the intermediate transfer belt 20 by the primary transfer roller 15Bk. Here, on the photosensitive member 50Bk, a desired toner image 96 to be formed starts to be developed with the toner by the developing device 13. In addition, as illustrated in FIG. 4C, the marking back toner 95 on the intermediate transfer belt 20 is carried to the secondary transfer portion ST. A predetermined secondary transfer bias is applied to the secondary transfer roller 65, and hence, as illustrated in FIG. 4D, the marking back toner 95 on the intermediate transfer belt 20 is attracted directly to the secondary transfer roller 65, to thereby adhere thereto. As illustrated in FIG. 4E, the sheet P is conveyed to the secondary transfer portion ST in synchronization with the desired toner image 96 on the intermediate transfer belt 20. As illustrated in FIG. 4F, at the secondary transfer portion ST, the desired toner image 96 is transferred onto a front surface of the sheet P, while the marking back toner 95 on the secondary transfer roller 65 adheres to a back surface of the sheet P. In this manner, the marking back occurs on the sheet P during the BD search according to the comparative example.

When the marking back toner 95 adheres to the secondary transfer roller 65, in order to prevent the occurrence of the marking back on the sheet P, the secondary transfer roller 65 needs to be rotated at idle until an amount of the marking back toner is reduced so that no marking back occurs on the sheet P, and a time period (first copy output time) until the copy of the first sheet is output becomes long. Further, productivity of the image forming apparatus 100 greatly depends on how the first copy output time is shortened. In order to shorten the first copy output time, the writing of the desired image 96 is started immediately after the BD search has been completed. Therefore, as illustrated in FIGS. 4A to 4F, the marking back toner 95 and the desired image 96 are arranged in extremely close positions. For that reason, it is difficult to prevent the marking back toner 95 from entering the subsequent stage by switching the respective kinds of bias between the marking back toner 95 and the desired image 96.

Further, in order to prevent the marking back toner 95 from adhering to the photosensitive member 50 even when the photosensitive member 50 is exposed during the BD search, it is conceivable to delay the application of the charging bias to the charging roller 12 and the application of the developing bias to the developing device 13. However, to pursue the shortening of the first copy output time, a time period from the rotation start of the motor 41 to the start of the image formation needs to be set as short as possible. In that case, the application of the charging bias to the charging roller 12 and the application of the developing bias to the developing device 13 need to be started substantially simultaneously with the rotation start of the motor 41. For that reason, the marking back toner 95 adheres to the photosensitive member 50, to thereby cause the marking back to occur on the sheet P.

Therefore, in the embodiment, the BD search capable of preventing the marking back from occurring on the sheet P is executed. Now, a configuration for executing the BD search according to the embodiment will be described.

[Motor]

Figure 5A:
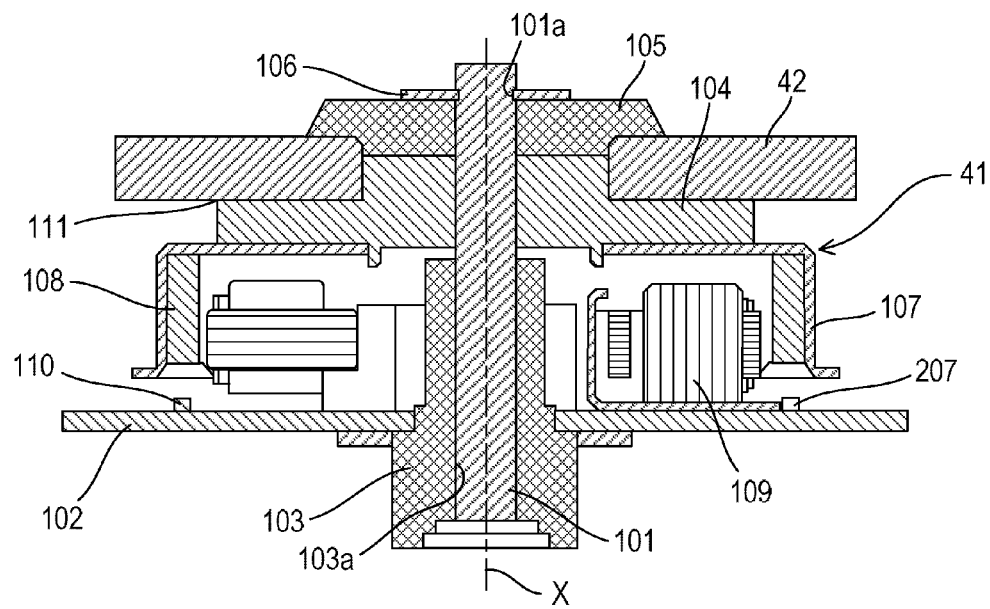
FIG. 5A is a sectional view of a motor configured to rotate a rotary polygon mirror.
Figure 5B:
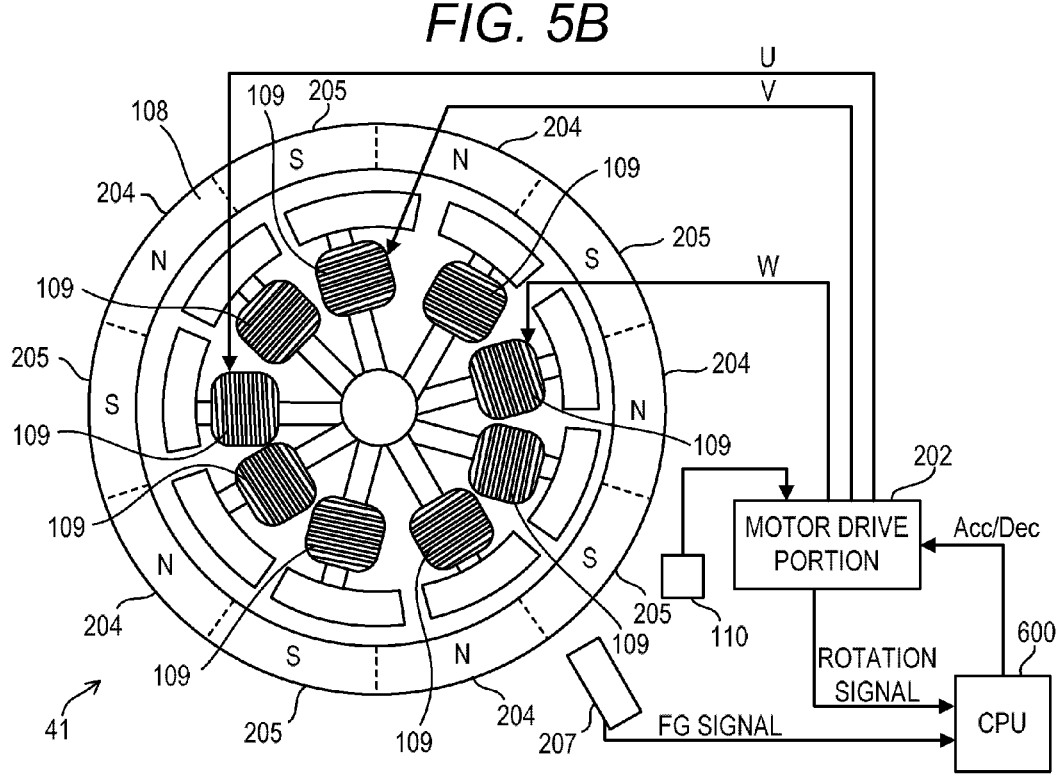
FIG. 5B is a circuit diagram of the motor.

FIG. 5A is a sectional view of the motor 41 configured to rotate the rotary polygon mirror 42. FIG. 5B is a circuit diagram of the motor 41. FIG. 5C is a diagram illustrating a relationship between an arrangement of magnetic poles of a rotor magnet 108 and an FG signal.

As illustrated in FIG. 5A, the motor 41 includes a rotation shaft 101, a bearing 103, a rotor magnet (rotor) 108, a stator coil (stator) 109, a Hall IC (rotation phase detecting portion) 110, and a frequency generator (hereinafter referred to as "FG") (speed detecting portion) 207. A substrate 102 is fixed to the housing 85 of the light scanning apparatus 40. The bearing 103 is fixed to the substrate 102 by caulking or the like. The rotation shaft 101 is inserted into an inner diameter hole 103a of the bearing 103 so as to be rotatably supported by the bearing 103.

A rotor boss 104 is fixed to the rotation shaft 101. The rotor boss 104 includes a bearing surface portion 111. The rotary polygon mirror 42 is arranged on the rotor boss 104 with a lower surface of the rotary polygon mirror 42 held in contact with the bearing surface portion 111 of the rotor boss 104. A presser plate 105 is arranged on an upper surface of the rotary polygon mirror 42 so as to be held in contact therewith. A grip ring 106 is arranged on the presser plate 105 to be engaged with an annular groove 101a of the rotation shaft 101. The rotary polygon mirror 42 is sandwiched between the rotor boss 104 and the presser plate 105 to be fixed to the rotor boss 104, in other words, the rotation shaft 101, by the grip ring 106.

A rotor frame 107 is fixed to a lower portion of the rotor boss 104. The rotor frame 107 has a cup shape obtained by drawing using a mold. The rotor magnet 108 is fixed to an inner periphery of the rotor frame 107. The rotor frame 107 is formed of a thin iron plate that allows high-precision drawing. The rotor magnet 108 is formed of a magnet made of rubber. The stator coil 109 is fixed onto the substrate 102. The stator coil 109 is arranged inside the rotor frame 107 so as to be opposed to the rotor magnet 108 in a direction orthogonal to an axis X of the rotation shaft 101.

The Hall IC 110 including the Hall element is arranged on the substrate 102. The Hall IC 110 is arranged so as to be opposed to the rotor magnet 108 in a direction parallel with the axis X of the rotation shaft 101. The FG 207 is arranged on the substrate 102. The FG 207 is arranged so as to be opposed to the rotor magnet 108 in a direction parallel with the axis X of the rotation shaft 101.

The rotary polygon mirror 42 is held by the rotation shaft 101 integrally with the rotor frame 107, the rotor magnet 108, the rotor boss 104, the presser plate 105, and the grip ring 106. The rotary polygon mirror 42 is rotated and stopped integrally with the rotor frame 107, the rotor magnet 108, the rotor boss 104, the presser plate 105, the grip ring 106, and the rotation shaft 101.

As illustrated in FIG. 5B, the motor 41 is electrically connected to the motor drive portion 202. The motor drive portion 202 is electrically connected to the CPU 600, the Hall IC 110, and the FG 207. The rotor magnet 108 of the motor 41 has a plurality of magnetic poles (S-pole and N-pole). In the embodiment, the rotor magnet 108 has five N-poles 204 and five S-poles 205. The rotor magnet 108 is an annular magnet in which the N-poles and the S-poles are magnetized alternately. Nine stator coils 109 are formed of coils U, coils V, and coils W. The Hall IC 110 outputs the voltage that changes in accordance with the rotation of the rotor magnet 108.

The motor drive portion 202 and the CPU 600 conducts rotation speed control of the motor 41. The motor drive portion 202 rotates the motor 41 by detecting the position of the rotor magnet 108 based on a change in the voltage output from the Hall IC 110 and switching a current flowing into the coils U, the coils V, and the coils W of the stator coil 109. The motor drive portion 202 controls the rotation speed of the motor 41 by changing the voltage applied to the stator coil 109 in accordance with an Acc/Dec signal (acceleration/deceleration signal) of the CPU 600. The CPU 600 detects the rotation speed of the motor 41 being actually rotated by using the FG signal (second signal) output from the FG (signal generating unit) 207. Alternatively, the CPU 600 may detect the rotation speed of the motor 41 being actually rotated by using a rotation signal obtained by the motor drive portion 202 based on a signal (second signal) output from the Hall IC (signal generating unit) 110. The CPU 600 outputs the Acc/Dec signal to the motor drive portion 202 so that the rotation speed of the motor 41 becomes the target rotation speed (predetermined rotation speed Vm for image formation), to thereby control the rotation speed of the motor 41.

The FG 207 generates an FG signal in accordance with a rotation phase of the rotary polygon mirror 42 (at the same rotation angle interval) so that a plurality of FG signals are generated at regular time intervals (at the same fixed interval of time) while the rotary polygon mirror 42 makes one revolution. In other words, the FG 207 generates the FG signal when the rotary polygon mirror 42 is rotated by a predetermined rotation angle relative to a virtual reference position of the rotary polygon mirror 42. As illustrated in FIG. 5C, the number of pulses of the FG signal generated during one revolution of the motor 41 is determined depending on the numbers of N-poles and S-poles of the rotor magnet 108. In the embodiment illustrated in FIG. 5C, the rotor magnet 108 has five pairs of the N-pole and the S-pole, and hence the number of pulses of the FG signal generated during one revolution of the motor 41 is five.

The Hall IC 110 may also be configured to generate a signal in accordance with the rotation angle of the rotary polygon mirror 42 (at the same rotation angle interval) so that a plurality of signals are generated at regular time intervals (at the same fixed interval of time) while the rotary polygon mirror 42 makes one revolution.

[Identification of Reflection Surface Candidate of Rotary Polygon Mirror]

In the embodiment, a reflection surface candidate of the rotary polygon mirror 42 is identified in order to determine the lighting-up timing of the light source 17 for generating the BD signal. When the lighting-up timing of the light source 17 is controlled based on the FG signal, the time interval between the FG signal and the BD signal may differ depending on the reflection surface of the rotary polygon mirror 42. Therefore, it is necessary to identify the reflection surface, which is used for generating the BD signal during the rotation of the rotary polygon mirror 42 and the light beam is to be entered. The time interval between the FG signal and the BD signal for each reflection surface is stored in a storage device in advance. The reflection surface is identified, and the lighting-up timing of the light source 17 is controlled based on the FG signal and the time interval between the FG signal and the BD signal for the identified reflection surface. Now, the identification of the reflection surface candidate of the rotary polygon mirror 42 according to the embodiment will be described.

Figure 6:
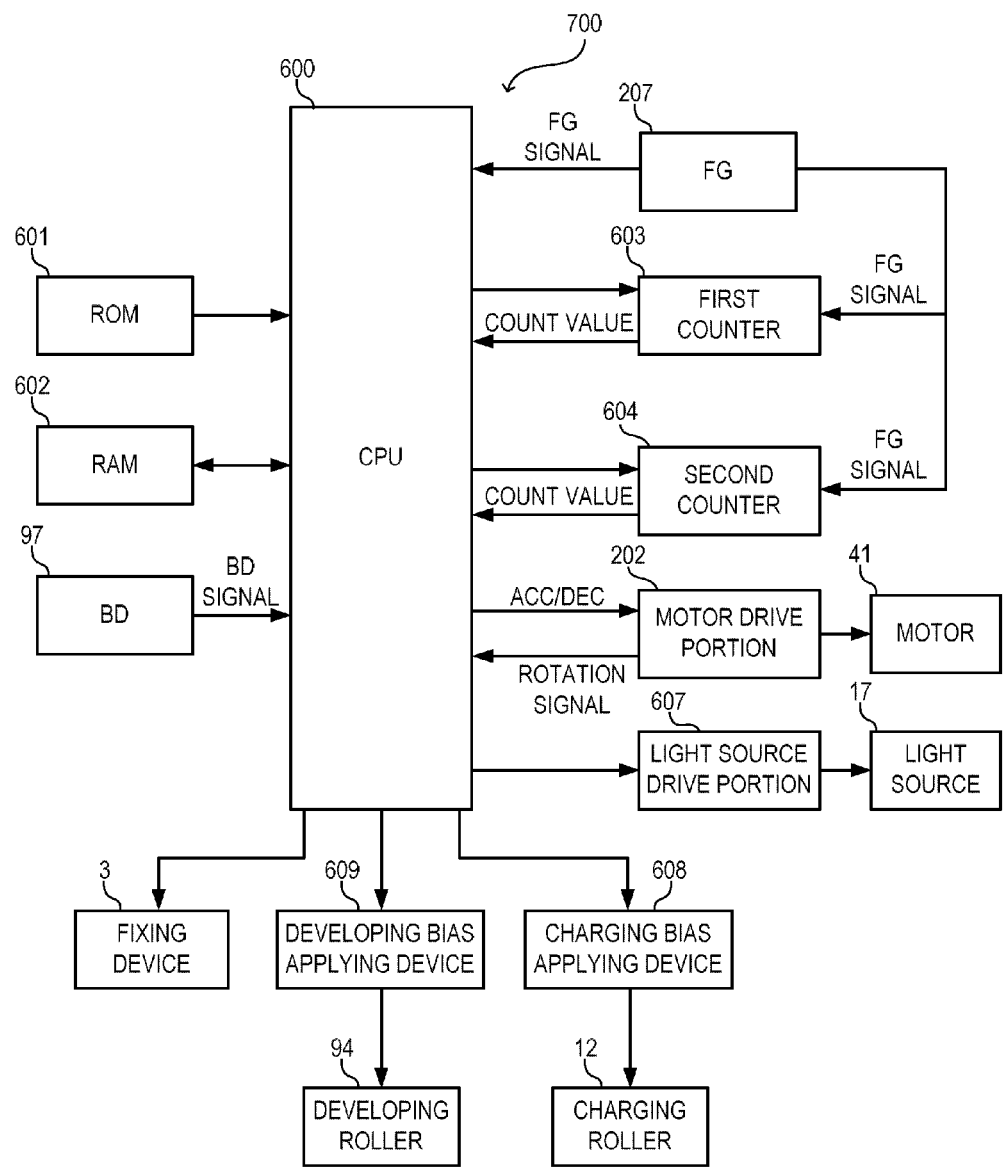
FIG. 6 is a block diagram of a control portion according to the embodiment.
Figure 7A:
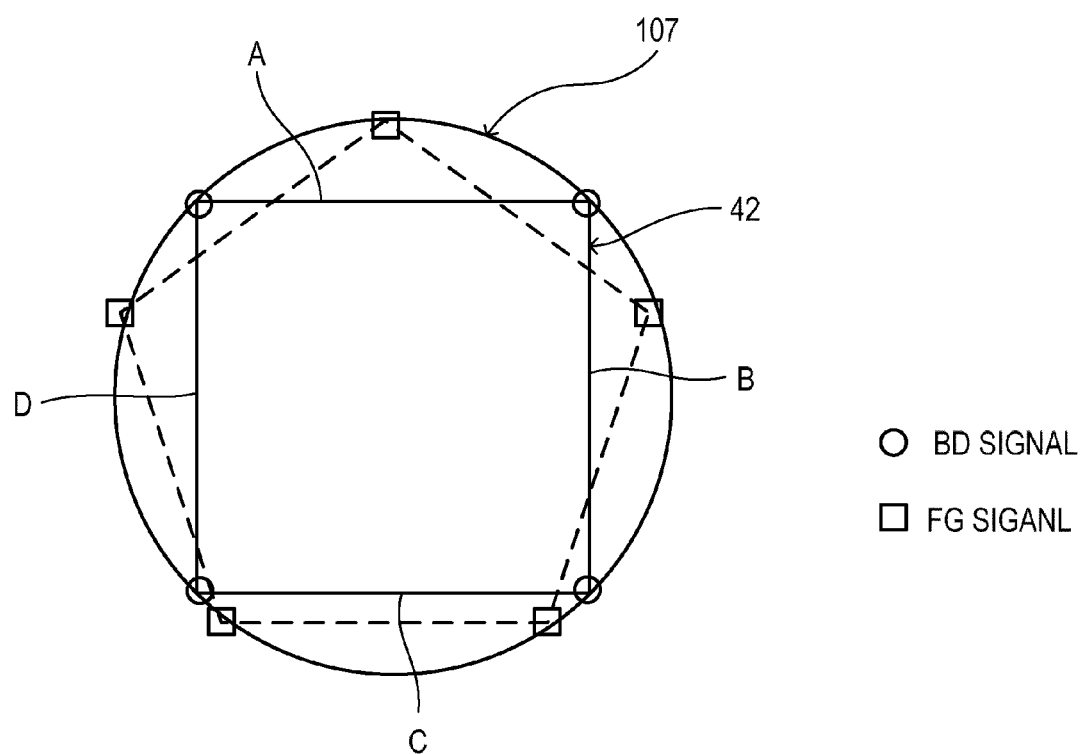
FIG. 7A is an explanatory diagram schematically illustrating an output position of a BD signal in the rotary polygon mirror and an output position of the FG signal in a rotor frame.

FIG. 6 is a block diagram of a control portion 700 according to the embodiment. FIG. 7A is an explanatory diagram schematically illustrating an output position of the BD signal in the rotary polygon mirror 42 and an output position of the FG signal in the rotor frame 107. FIG. 7B is a timing chart illustrating a relationship between the BD signal and the FG signal. With reference to FIG. 6, FIG. 7A, and FIG. 7B, a structure for identifying reflection surfaces A, B, C, and D of the rotary polygon mirror 42 will be described.

As illustrated in FIG. 6, the control portion (control unit) 700 includes the CPU (control device) 600, a ROM (storage unit) 601, a RAM (storage unit) 602, a first counter 603, a second counter 604, the BD 97, the FG 207, the motor drive portion 202, and a light source drive portion 607. In addition, the control portion 700 includes a charging bias applying device (voltage applying device) 608 configured to apply the charging bias (voltage) for image formation to the charging roller 12. Further, the control portion 700 includes a developing bias applying device (voltage applying device) 609 configured to apply the developing bias (voltage) for image formation to the developing roller 94 of the developing device 13. The CPU 600 is electrically connected to the ROM 601, the RAM 602, the first counter 603, the second counter 604, the BD 97, the FG 207, the motor drive portion 202, the light source drive portion 607, the charging bias applying device 608, and the developing bias applying device 609.

The light source drive portion 607 is provided to the light source control substrate 92 (92a, 92b) of the light scanning apparatus 40. The motor drive portion 202 is provided to the circuit board 43. The CPU 600 controls the light source drive portion 607 and the motor drive portion 202. Further, the CPU 600 controls a temperature of the fixing device 3, the developing bias to be applied to the developing roller 94 of the developing device 13, and the charging bias to be applied to the charging roller 12.

In the embodiment, the rotary polygon mirror 42 includes the four reflection surfaces A, B, C, and D (FIG. 7A). While the rotary polygon mirror 42 makes one revolution, the light beam L is reflected by the four reflection surfaces A, B, C, and D to enter the BD 97, and hence the BD 97 outputs four BD signals (pulse signals) while the rotary polygon mirror 42 makes one revolution. The FG 207 outputs five FG signals while the rotary polygon mirror 42 makes one revolution along with the rotor flange 107 including the rotor magnet 108. The periods of the four reflection surfaces A, B, C, and D of the rotary polygon mirror 42 each fall substantially between the adjacent BD signals (FIG. 7B). In other words, there exist a reflection surface from which one FG signal is output between the BD signals and a reflection surface from which two FG signals are output between the BD signals while the rotary polygon mirror 42 makes one revolution. In the embodiment, as illustrated in FIG. 7B, one FG signal is output during each period between the BD signals corresponding to the reflection surfaces A, B, and D, and two FG signals are output during the period between the BD signals corresponding to the reflection surface C. Here, for the sake of brevity of the following description, as illustrated in FIG. 7B, the plurality of BD signals are represented by symbols BD_A, BD_B, BD_C, and BD_D. Further, as illustrated in FIG. 7B, the plurality of FG signals are represented by symbols FG_1, FG_2, FG_3, FG_4, and FG_5. Note that, those symbols are not results of identifying orders of the BD signals and the FG signals by the CPU 600, but are defined merely for the sake of convenience.

The first counter 603 counts the number of pulses of the FG signal output from the FG 207 between the BD signals output from the BD 97. The first counter 603 is reset each time the BD signal is detected. In other words, the count value of the first counter 603 includes three kinds of values, namely, "0", "1", and "2". In the embodiment, the first counter 603 has the count value of "1" for each of the periods during which the light beam is deflected by the reflection surface A, the reflection surface B, and the reflection surface D, and has the count value of "2" for the period during which the light beam is deflected by the reflection surface C (FIG. 7B).

The ROM 601 stores a phase relation between the BD signal and the FG signal output while the rotary polygon mirror 42 makes one revolution. The rotary polygon mirror 42 is fixed to the rotation shaft 101 of the motor 41 at a time of assembly. The rotor flange 107 to which the rotor magnet 108 is fixed is also fixed to the rotation shaft 101 of the motor 41. Therefore, the phase relation between the BD signal and the FG signal output while the rotary polygon mirror 42 makes one revolution as illustrated in FIG. 7B does not fluctuate during a rotation action of the rotary polygon mirror 42. The ROM 601 may store, for example, the time interval between the FG signal and the BD signal for each reflection surface with the predetermined rotation speed for image formation, as phase difference information (phase difference data) indicating the phase relation.

The CPU 600 obtains four count values from the first counter 603 while the rotary polygon mirror 42 makes one revolution. The numbers of the four count values are the same as the number "4" of reflection surfaces of the rotary polygon mirror 42. The CPU 600 compares the four count values of the FG signal counted by the first counter 603 with a count pattern (described later) of the FG signal stored in advance in the ROM 601, and identifies each of the reflection surfaces A, B, C, and D of the rotary polygon mirror 42 based on a comparison result thereof. The count pattern indicates a correspondence between the four count values and a plurality of reflection surfaces.

The second counter 604 counts the FG signal output from the FG 207. The second counter 604 is reset each time the five FG signals are counted. In other words, the count value of the second counter 604 includes five kinds of values, namely, "0", "1", "2", "3", and "4". A count start point of the second counter 604 may be any FG signal of the five FG signals. Accordingly, the count pattern of the second counter 604 during the rotation of the rotary polygon mirror is any one of patterns indicated by (i), (ii), (iii), (iv), and (v) in FIG. 7B.

The CPU 600 associates the count value of the first counter 603 with the count value of the second counter 604. For example, when the second counter 604 indicates the count pattern indicated by (i), the CPU 600 associates FG_1 with the count value "1", and the subsequent FG_2, FG_3, FG_4, and FG_5 with the count values "2", "3", "4", and "0", respectively.

As described above, the ROM 601 stores phase information indicating the phase relation between the FG signal and the BD signal. For example, the phase information includes information on a generation timing difference between FG_1 and BD_B illustrated in FIG. 7B obtained in a case where the light beam is kept on in a state in which the rotary polygon mirror 42 is rotated with the above-mentioned predetermined rotation speed. The phase information includes information on the generation timing difference between FG_2 and BD_C, information on the generation timing difference between FG_3 or FG_4 and BD_D, and information on the generation timing difference between FG_5 and BD_A. The light beam is emitted based on the generation timing difference between each FG signal and the BD signal corresponding to each FG signal, to thereby be able to identify an emitting timing of the light beam to the BD 97 for generating BD_B, BD_C, BD_D, and BD_A without exposing the photosensitive member. In other words, the light beam is emitted at a timing earlier than the generation timing of the FG signal minutely by the generation timing difference between each FG signal and the BD signal corresponding to each FG signal, to thereby allow the light beam to scan the surface of the BD 97.

Note that, the phase information may be information indicating whether or not to emit the light beam with a delay from the generation timing indicated by FG_1 illustrated in FIG. 7B by X1 seconds while the rotary polygon mirror 42 is being rotated with the above-mentioned predetermined rotation speed. The light beam scans the surface of the BD 97 by being emitted with a delay from the generation timing of FG_1 by X1 seconds, and hence the BD generates BD_B. The phase information includes information indicating whether or not to emit the light beam with a delay from the generation timing of FG_2 by X2 seconds. Further, the phase information includes information indicating whether or not to emit the light beam with a delay from the generation timing of FG_3 by X3 seconds, or information indicating whether or not to emit the light beam with a delay from the generation timing of FG_4 by X4 seconds (X3>X4). In addition, the phase information includes information indicating whether or not to emit the light beam with a delay from the generation timing of FG_5 by X5 seconds. By controlling the light source based on those pieces of phase information, it is possible to identify the emitting timing of the light beam to the BD 97 for generating BD_C, BD_D, and BD_A without exposing the photosensitive member.

[Reflection Surface Identifying Sequence of CPU]

Figure 8:
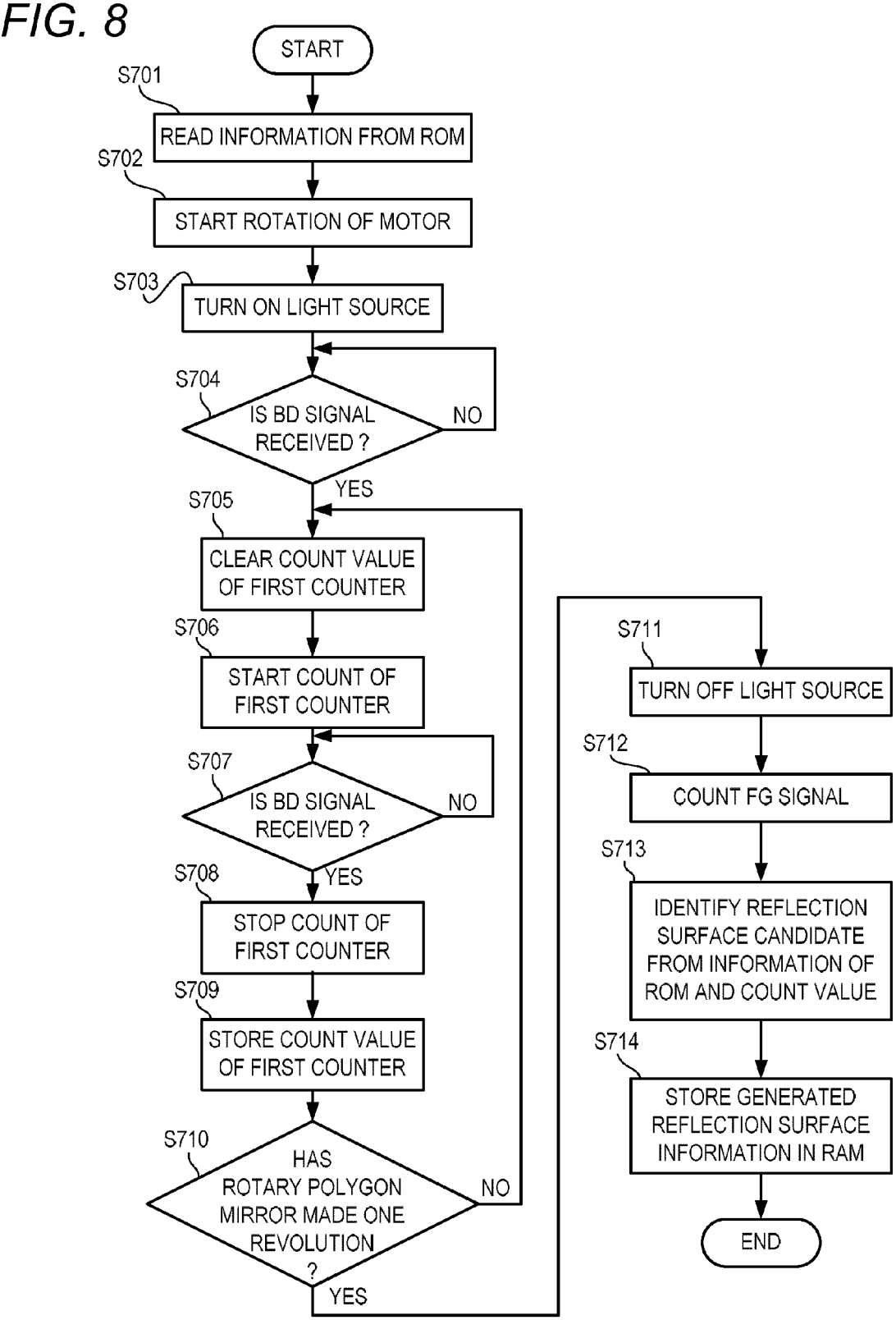
FIG. 8 is a flowchart illustrating a reflection surface identifying sequence of a CPU according to the embodiment.

Next, with reference to FIG. 8, a reflection surface identifying sequence of the CPU 600 for identifying the reflection surface of the rotary polygon mirror 42 will be described. FIG. 8 is a flowchart illustrating the reflection surface identifying sequence of the CPU 600 according to the embodiment. A control program is stored in the ROM 601. The CPU 600 reads the control program from the ROM 601, and executes processing illustrated in the flowchart of FIG. 8 based on the control program.

When the reflection surface identifying sequence is started, the CPU 600 reads information from the ROM 601 (S701). The information includes the count pattern of the FG signal per revolution of the rotary polygon mirror 42. The CPU 600 starts the rotation of the rotary polygon mirror 42 by the motor 41 (S702). After the rotary polygon mirror 42 starts the rotation, the CPU 600 controls the light source drive portion 607 to turn on the light source 17 so as to emit the light beam (S703). The light source 17 continuously emits the light beam during at least one revolution of the rotary polygon mirror 42. The light beam emitted from the light source 17 is reflected (deflected) by the reflection surface of the rotary polygon mirror 42, to thereby scan the surface of the photosensitive member 50 and enter the BD 97. At this time, the photosensitive member 50 or the developing roller 94 is not being rotated. Further, the charging bias or the developing bias is not being applied to the charging roller 12 or the developing roller 94. Therefore, the electrostatic latent image on the photosensitive member 50 is not to be developed.

The BD signal output from the BD 97 is input to the CPU 600. The CPU 600 determines whether or not the BD signal has been received (S704). When the BD signal has been received (YES in Step S704), the count value of the first counter 603 is cleared to 0 (S705). The CPU 600 causes the first counter 603 to start the count of the count of the FG signal (S706). The FG signal output from the FG 207 is input to the first counter 603, and the first counter 603 counts the FG signal. The first counter 603 may count a rise or a fall of the FG signal or the rise and the fall thereof.

The CPU 600 determines whether or not the BD signal has been received (S707). When the BD signal has not been received (NO in Step S707), the CPU 600 causes the first counter 603 to continue the count of the FG signal. When the BD signal has been received (YES in Step S707), the CPU 600 stops the count of the FG signal conducted by the first counter 603. The CPU 600 stores the count value of the first counter 603 in the RAM 602 (S709).

The CPU 600 determines whether or not the rotary polygon mirror 42 has made one revolution (S710). It may be determined whether or not the rotary polygon mirror 42 has made one revolution based on whether or not the number of BD signals output from the BD 97 has reached the number of reflection surfaces of the rotary polygon mirror 42. In the embodiment, the number of reflection surfaces of the rotary polygon mirror 42 is 4, and hence it is determined whether or not the BD signal has been received four times. The CPU returns to Step S705 when determining that the rotary polygon mirror 42 has not made one revolution (NO in Step S710). The CPU 600 repeats Steps S705 to S710 a number of times corresponding to the number of reflection surfaces of the rotary polygon mirror 42, and stores the count values of the FG signal, the number of which corresponds to the number of reflection surfaces, in the RAM 602.

When determining that the rotary polygon mirror 42 has made one revolution (YES in Step S710), the CPU 600 controls the light source drive portion 607 to turn off the light source 17 (S711). The FG signal output from the FG 207 is also input to the second counter 604. The CPU 600 causes the second counter 604 to count the FG signal (S712).

Subsequently, the CPU 600 identifies the reflection surface candidate of the rotary polygon mirror 42 from the count pattern of the FG signal read from the ROM 601 in Step S701 and the count value of the FG signal stored in the RAM 602 in Step S709, to thereby generate reflection surface information (S713). Note that, a method of generating the reflection surface information on the rotary polygon mirror 42 will be described later. The CPU 600 stores the generated reflection surface information in the RAM 602 (S714). The CPU 600 brings the reflection surface identifying sequence to an end.

Subsequently, the CPU 600 controls the motor drive portion 202 to rotate the motor 41, and continues the rotation of the rotary polygon mirror 42. The second counter 604 continues the count of the FG signal output from the FG 207. By continuing the count of the FG signal, it is possible to maintain effectiveness of the reflection surface information on the rotary polygon mirror 42 generated in Step S713. In the embodiment, five FG signals are output during one revolution of the rotary polygon mirror 42. Therefore, by continuing the count of the FG signal, it is possible to maintain a relationship between the generated reflection surface information and the FG signal.

[Description of Method of Generating Reflection Surface Information]

Now, a method of generating the reflection surface information on the rotary polygon mirror 42 in Step S713 of FIG. 8 will be described. In the embodiment, the case where the rotary polygon mirror 42 includes four reflection surfaces and five FG signals are output during one revolution of the rotary polygon mirror 42 will be described. However, the number of reflection surfaces of the rotary polygon mirror 42 and the number of FG signals per revolution of the rotary polygon mirror 42 are not limited thereto. FIG. 9 (*a*) to FIG. 9 (*l*) are diagrams illustrating a relationship between the number of reflection surfaces and the number of FG signals according to the embodiment. With reference to FIG. 9 (*a*) to FIG. 9 (*l*), the method of generating the reflection surface information on the rotary polygon mirror 42 will be described.

FIG. 9 (*a*), FIG. 9 (*b*), and FIG. 9 (*c*) illustrate cases where the number of reflection surfaces of the rotary polygon mirror 42 is 4 and the numbers of FG signals per revolution of the rotary polygon mirror 42 are 4, 5, and 6, respectively. FIG. 9 (*d*), FIG. 9 (*e*), and FIG. 9 (*f*) illustrate cases where the number of reflection surfaces of the rotary polygon mirror 42 is 5 and the numbers of FG signals per revolution of the rotary polygon mirror 42 are 4, 5, and 6, respectively. FIG. 9 (*g*), FIG. 9 (*h*), and FIG. 9 (*i*) illustrate cases where the number of reflection surfaces of the rotary polygon mirror 42 is 6 and the numbers of FG signals per revolution of the rotary polygon mirror 42 are 4, 5, and 6, respectively. FIG. 9 (*j*), FIG. 9 (*k*), and FIG. 9 (*l*) illustrate cases where the number of reflection surfaces of the rotary polygon mirror 42 is 8 and the numbers of FG signals are 4, 5, and 6, respectively.

The CPU 600 compares the count value of the FG signal stored in the RAM 602 in Step S709 of FIG. 8 with the count pattern of the FG signal read from the ROM 601. The count pattern stored in advance in the ROM 601 according to the embodiment is the count values of the FG signal for the respective reflection surfaces of the rotary polygon mirror 42 as shown in the following table.

When the number of FG signals is 4 and the number of reflection surfaces is 4 as illustrated in FIG. 9 (*a*), the relationship between the count value of the FG signal and a surface number as the count pattern is as shown in Table 1.

TABLE 1

| <Number of FG Signals: 4; Number of Reflection Surfaces: 4> | |
| --- | --- |
| Count value of FG signal | Surface number |
| 1 | A |
| 1 | B |
| 1 | C |
| 1 | D |

When the number of FG signals and the number of reflection surfaces are equal to each other, the same phase relation between the FG signal and the BD signal is repeated, and hence it is not necessary to identify the reflection surface of the rotary polygon mirror 42.

When the number of FG signals is 5 and the number of reflection surfaces is 4 as illustrated in FIG. 9 (*b*), the relationship between the count value of the FG signal and the surface number as the count pattern is as shown in Table 2.

TABLE 2

| <Number of FG Signals: 5; Number of Reflection Surfaces: 4> | |
| --- | --- |
| Count value of FG signal | Surface number |
| 1 | A |
| 1 | B |
| 2 | C |
| 1 | D |

The rotary polygon mirror 42 includes the reflection surface C corresponding to the count value of the FG signal being 2 between the BD signal and the BD signal. The reflection surface of the rotary polygon mirror 42 corresponding to the count value of the FG signal being 2 can be determined to be the reflection surface C. Therefore, the reflection surface of the rotary polygon mirror 42 corresponding to the count value of the FG signal being 2 can be identified as the reflection surface C, the next reflection surface can be identified as the reflection surface D, the next as the reflection surface A, and the next as the reflection surface B, which allows the identification of all the reflection surfaces. Table 2 is an example in which the number of reflection surfaces of the rotary polygon mirror 42 is N (N≥4) while the number of FG signals generated during one revolution of the rotary polygon mirror 42 is N+1.

When the number of FG signals is 6 and the number of reflection surfaces is 4 as illustrated in FIG. 9 (*c*), the relationship between the count value of the FG signal and the surface number as the count pattern is as shown in Table 3.

TABLE 3

| <Number of FG Signals: 6; Number of Reflection Surfaces: 4> | |
| --- | --- |
| Count value of FG signal | Surface number |
| 1 | A/C |
| 2 | B/D |
| 1 | C/A |
| 2 | D/B |

The reflection surface corresponding to the count value of the FG signal being 2 between the BD signal and the BD signal and the reflection surface corresponding to the count value of the FG signal being 1 between the BD signal and the BD signal are repeated. The reflection surface of the rotary polygon mirror 42 corresponding to the count value being 1 can be identified as the reflection surface A or the reflection surface C. The reflection surface of the rotary polygon mirror 42 corresponding to the count value being 2 can be identified as the reflection surface B or the reflection surface D. Table 3 is an example in which the number of reflection surfaces of the rotary polygon mirror 42 is N (N≥4) while the number of FG signals generated during one revolution of the rotary polygon mirror 42 is N+2.

When the number of FG signals is 4 and the number of reflection surfaces is 5 as illustrated in FIG. 9 (*d*), the relationship between the count value of the FG signal and the surface number as the count pattern is as shown in Table 4.

TABLE 4

| <Number of FG Signals: 4; Number of Reflection Surfaces: 5> | |
| --- | --- |
| Count value of FG signal | Surface number |
| 1 | A |
| 1 | B |
| 1 | C |
| 0 | D |
| 1 | E |

The rotary polygon mirror 42 includes the reflection surface corresponding to the count value of the FG signal being 0 between the BD signal and the BD signal. The reflection surface of the rotary polygon mirror 42 corresponding to the count value of the FG signal being 0 can be determined to be the reflection surface D. Therefore, the reflection surface of the rotary polygon mirror 42 corresponding to the count value of the FG signal being 0 can be identified as the reflection surface D, the next reflection surface can be identified as the reflection surface E, the next as the reflection surface A, the next as the reflection surface B, and the next as the reflection surface C, which allows the identification of all the reflection surfaces. Table 4 is an example in which the number of reflection surfaces of the rotary polygon mirror is N (N≥4) while the number of FG signals generated during one revolution of the rotary polygon mirror 42 is N−1.

When the number of FG signals is 5 and the number of reflection surfaces is 5 as illustrated in FIG. 9 (*e*), the relationship between the count value of the FG signal and the surface number as the count pattern is as shown in Table 5.

TABLE 5

| <Number of FG Signals: 5; Number of Reflection Surfaces: 5> | |
| --- | --- |
| Count value of FG signal | Surface number |
| 1 | A |
| 1 | B |
| 1 | C |
| 1 | D |
| 1 | E |

When the number of FG signals and the number of reflection surfaces are equal to each other, the same phase relation between the FG signal and the BD signal is repeated, and hence it is not necessary to identify the reflection surface of the rotary polygon mirror 42.

When the number of FG signals is 6 and the number of reflection surfaces is 5 as illustrated in FIG. 9 (*f*), the relationship between the count value of the FG signal and the surface number as the count pattern is as shown in Table 6.

TABLE 6

<Number of FG Signals: 6; Number of Reflection Surfaces: 5>

| Count value of FG signal | Surface number |
|---|---|
| 1 | A |
| 1 | B |
| 1 | C |
| 2 | D |
| 1 | E |

The rotary polygon mirror 42 includes the reflection surface corresponding to the count value of the FG signal being 2 between the BD signal and the BD signal. The reflection surface of the rotary polygon mirror 42 corresponding to the count value of the FG signal being 2 can be determined to be the reflection surface D. Therefore, the reflection surface of the rotary polygon mirror 42 corresponding to the count value of the FG signal being 2 can be identified as the reflection surface D, the next reflection surface can be identified as the reflection surface E, the next as the reflection surface A, the next as the reflection surface E, and the next as the reflection surface C, which allows the identification of all the reflection surfaces. Table 6 is an example in which the number of reflection surfaces of the rotary polygon mirror is N (N≥4) while the number of FG signals generated during one revolution of the rotary polygon mirror 42 is N+1.

When the number of FG signals is 4 and the number of reflection surfaces is 6 as illustrated in FIG. 9 (g), the relationship between the count value of the FG signal and the surface number as the count pattern is as shown in Table 7.

TABLE 7

<Number of FG Signals: 4; Number of Reflection Surfaces: 6>

| Count value of FG signal | Surface number |
|---|---|
| 1 | A/D |
| 1 | B/E |
| 0 | C/F |
| 1 | D/A |
| 1 | E/B |
| 0 | F/C |

The rotary polygon mirror 42 includes two reflection surfaces each corresponding to the count value of the FG signal being 0 between the BD signal and the BD signal. The reflection surfaces of the rotary polygon mirror 42 each corresponding to the count value of the FG signal being 0 can be determined to be the reflection surface C and the reflection surface F, respectively. Further, the count value of the FG signal includes such a count pattern that "1, 1, 0" is repeated. Therefore, the reflection surface of the rotary polygon mirror 42 corresponding to the first "1" of the count pattern "1, 1, 0" can be identified as the reflection surface A or the reflection surface D, the reflection surface corresponding to the second "1" can be identified as the reflection surface B or the reflection surface E, and the reflection surface corresponding to the count value being 0 can be identified as the reflection surface C or the reflection surface F. Table 7 is an example in which the number of reflection surfaces of the rotary polygon mirror 42 is N (N≥6) while the number of FG signals generated during one revolution of the rotary polygon mirror 42 is N−2.

When the number of FG signals is 5 and the number of reflection surfaces is 6 as illustrated in FIG. 9 (h), the relationship between the count value of the FG signal and the surface number as the count pattern is as shown in Table 8.

TABLE 8

<Number of FG Signals: 5; Number of Reflection Surfaces: 6>

| Count value of FG signal | Surface number |
|---|---|
| 1 | A |
| 0 | B |
| 1 | C |
| 1 | D |
| 1 | E |
| 1 | F |

The rotary polygon mirror 42 includes the reflection surface corresponding to the count value of the FG signal being 0 between the BD signal and the BD signal. The reflection surface of the rotary polygon mirror 42 corresponding to the count value of the FG signal being 0 can be determined to be the reflection surface B. Therefore, the reflection surface of the rotary polygon mirror 42 corresponding to the count value of the FG signal being 0 can be identified as the reflection surface B, the next reflection surfaces can be identified as the reflection surface C, the next as the reflection surface D, the next as the reflection surface E, the next as the reflection surface F, and the next as the reflection surface A, which allows the identification of all the reflection surfaces. Table 8 is an example in which the number of reflection surfaces of the rotary polygon mirror is N (N≥4) while the number of FG signals generated during one revolution of the rotary polygon mirror 42 is N−1.

When the number of FG signals is 6 and the number of reflection surfaces is 6 as illustrated in FIG. 9 (i), the relationship between the count value of the FG signal and the surface number as the count pattern is as shown in Table 9.

TABLE 9

<Number of FG Signals: 6; Number of Reflection Surfaces: 6>

| Count value of FG signal | Surface number |
|---|---|
| 1 | A |
| 1 | B |
| 1 | C |
| 1 | D |
| 1 | E |
| 1 | F |

When the number of FG signals and the number of reflection surfaces are equal to each other, the same phase relation between the FG signal and the BD signal is repeated, and hence it is not necessary to identify the reflection surface of the rotary polygon mirror 42.

When the number of FG signals is 4 and the number of reflection surfaces is 8 as illustrated in FIG. 9 (j), the relationship between the count value of the FG signal and the surface number as the count pattern is as shown in Table 10.

TABLE 10

<Number of FG Signals: 4; Number of Reflection Surfaces: 8>

| Count value of FG signal | Surface number |
|---|---|
| 1 | A/C/E/G |
| 0 | B/D/F/H |
| 1 | A/C/E/G |
| 0 | B/D/F/H |
| 1 | A/C/E/G |
| 0 | B/D/F/H |
| 1 | A/C/E/G |
| 0 | B/D/F/H |

The rotary polygon mirror 42 includes the reflection surface corresponding to the count value of the FG signal being 0 between the BD signal and the BD signal, and the reflection surface corresponding to the count value of the FG signal being 1 between the BD signal and the BD signal. The reflection surface corresponding to the count value being 0 and the reflection surface corresponding to the count value being 1 have the same phase relation between the FG signal and the BD signal, and are alternately repeated. The reflection surface of the rotary polygon mirror 42 corresponding to the count value of the FG signal being 1 can be identified as the reflection surface A, the reflection surface C, the reflection surface E, or the reflection surface G, the reflection surface of the rotary polygon mirror 42 corresponding to the count value of the FG signal being 0 can be identified as the reflection surface B, the reflection surface D, the reflection surface F, or the reflection surface H. Table 10 is an example in which the number of reflection surfaces of the rotary polygon mirror 42 is N (N≥8) while the number of FG signals generated during one revolution of the rotary polygon mirror 42 is N−4.

When the number of FG signals is 5 and the number of reflection surfaces is 8 as illustrated in FIG. 9 (k), the relationship between the count value of the FG signal and the surface number as the count pattern is as shown in Table 11.

TABLE 11

<Number of FG Signals: 5; Number of Reflection Surfaces: 8>

| Count value of FG signal | Surface number |
|---|---|
| 1 | A |
| 1 | B |
| 0 | C |
| 1 | D |
| 0 | E |
| 1 | F |
| 1 | G |
| 0 | H |

The rotary polygon mirror 42 includes the reflection surface corresponding to the count value of the FG signal being 0 between the BD signal and the BD signal and the reflection surface corresponding to the count value of the FG signal being 1 between the BD signal and the BD signal. Further, the count value of the FG signal includes such a count pattern that "1, 1, 0, 1, 0, 1, 1, 0" is repeated. Therefore, the reflection surface of the rotary polygon mirror 42 corresponding to the first "1" of the count pattern "1, 1, 0, 1, 0, 1, 1, 0" can be identified as the reflection surface A, and the next reflection surfaces can be identified as the reflection surface B, the reflection surface C, the reflection surface D, the reflection surface E, the reflection surface F, the reflection surface G, and the reflection surface H in order, which allows the identification of all the reflection surfaces. Table 11 is an example in which the number of reflection surfaces of the rotary polygon mirror 42 is N (N≥7) while the number of FG signals generated during one revolution of the rotary polygon mirror 42 is N−3.

When the number of FG signals is 6 and the number of reflection surfaces is 8 as illustrated in FIG. 9 (l), the relationship between the count value of the FG signal and the surface number as the count pattern is as shown in Table 12.

TABLE 12

<Number of FG Signals: 6; Number of Reflection Surfaces: 8>

| Count value of FG signal | Surface number |
|---|---|
| 0 | A/E |
| 1 | B/F |
| 1 | C/G |
| 1 | D/H |
| 0 | E/A |
| 1 | F/B |
| 1 | G/C |
| 1 | H/D |

The rotary polygon mirror 42 includes two reflection surfaces each corresponding to the count value of the FG signal being 0 between the BD signal and the BD signal. The reflection surfaces of the rotary polygon mirror 42 corresponding to the count value of the FG signal being 0 can be determined to be the reflection surface A and the reflection surface E, respectively. Further, the count value of the FG signal includes such a count pattern that "0, 1, 1, 1" is repeated. Therefore, the reflection surface corresponding to "0" of the count pattern "0, 1, 1, 1" can be identified as the reflection surface A or the reflection surface E, the next reflection surface can be identified as the reflection surface B or the reflection surface F, the next as the reflection surface C or the reflection surface G, and the next as the reflection surface D or the reflection surface H. Table 12 is an example in which the number of reflection surfaces of the rotary polygon mirror 42 is N (N≥6) while the number of FG signals generated during one revolution of the rotary polygon mirror 42 is N−2.

The count pattern indicating the correspondence between the count value of the FG signal and the reflection surface of the rotary polygon mirror 42 is stored in advance in the ROM 601. Therefore, by comparing the count value of the FG signal stored in the RAM 602 in Step S709 of FIG. 8 with the count pattern read from the ROM 601, the CPU 600 can identify the reflection surface of the rotary polygon mirror 42 and generate the reflection surface information.

[Description of Timing Chart that can Avoid Marking Back by Carrying Out Reflection Surface Identification During Acceleration of Rotary Polygon Mirror]

Next, with reference to FIG. 10, a timing of a reflection surface identification sequence SR during an operation of copy or print output conducted by the image forming apparatus 100 including the light scanning apparatus 40 having the above-mentioned configuration will be described in detail.

FIG. 10 is a timing chart of the reflection surface identification sequence SR according to the embodiment. In FIG. 10, when a user issues an instruction to start print or copy from an operation portion (not shown) of the image forming apparatus 100 or an external device (not shown) to the image forming apparatus 100, the CPU 600 receives the print/copy signal S0 (time T0). When receiving the print/copy signal S0, the CPU 600 starts raising the temperature of the fixing device 3 and driving the motor 41 via the motor drive portion 202. The motor drive portion 202 accelerates the motor 41 in accordance with an acceleration signal ACC received from the CPU 600.

The CPU 600 executes the reflection surface identification sequence SR configured to identify the reflection surface of the rotary polygon mirror 42 during the acceleration of the motor 41. The reflection surface identification sequence SR of Step 703 to Step 711 illustrated in FIG. 8 is executed before the charging bias is applied to the charging roller 12 and before the developing bias is applied to the developing device 13. As illustrated in FIG. 3, the marking back occurs on the recording medium if an image formation area of the photosensitive member 50 is irradiated with the light beam while the charging bias is applied to the charging roller or while the developing bias is applied to the developing device 13. Therefore, in the embodiment, the light source 17 is turned on to execute the reflection surface identification sequence SR before the charging bias and the developing bias are applied. Therefore, it is possible to prevent the marking back from occurring on the recording medium.

The CPU 600 turns on the light source 17 (time T1) after the rotation of the motor 41 is started before the predetermined rotation speed Vm for the image formation is reached (during acceleration), to thereby start the reflection surface identification sequence SR. In the reflection surface identification sequence SR, the light source 17 emits the light beam across an entire width of the photosensitive member 50 while maintaining a light-emitting state during a period in which the rotary polygon mirror 42 makes one revolution. When the light beam enters the BD 97, the BD 97 outputs the BD signal to the CPU 600. The CPU 600 obtains the count value of the FG signal corresponding to each of the plurality of reflection surfaces based on the BD signal received from the BD 97 and the FG signal received from the FG 207. The CPU 600 compares the obtained plurality of count values with the count pattern stored in advance in the ROM 601, to thereby identify the plurality of reflection surfaces of the rotary polygon mirror 42 and store reflection surface identification information in the RAM (storage unit) 602. The CPU 600 causes the second counter 604 to continue the count of the FG signal in order to maintain the effectiveness of the reflection surface identification information.

Even when the motor 41 reaches the predetermined rotation speed Vm for the image formation to be steadily rotated with the predetermined rotation speed Vm, the image forming apparatus 100 cannot immediately form an image, and enters a state of standing by for the rise in the temperature of the fixing device 3. In FIG. 10, when the temperature of the fixing device 3 reaches a photosensitive member rotation allowable temperature TA (time T2), the CPU 600 starts the operation of the image forming portion 10 of the image forming apparatus 100. The CPU 600 starts rotating the photosensitive member 50 and the developing roller 94 of the developing device 13 for the image forming operation.

When the rotation speed of the photosensitive member 50 reaches the predetermined rotation speed Vd for image formation, the CPU 600 starts applying the charging bias to the charging roller 12. Further, when the rotation speed of the developing roller 94 reaches the predetermined rotation speed Vr for image formation, the CPU 600 starts applying the developing bias to the developing roller 94.

As described above, the emission of the light beam for identifying the reflection surface of the rotary polygon mirror 42 is carried out before the application of the charging bias or the developing bias, which can prevent the marking back from occurring on the recording medium. Further, the number of FG signals keeps being counted even after the reflection surface identifying sequence for the rotary polygon mirror 42, it is possible to keep identifying the reflection surface of the rotary polygon mirror 42 without emitting the light beam. Immediately before the image formation, the CPU 600 executes a BD area light emission search sequence in order to determine the emitting timing of the light beam for generating the BD signal. In the BD area light emission search sequence, the CPU 600 controls the turning on and off of the light source 17 based on the count value of the FG signal of the second counter 604, the reflection surface identification information, and the phase relation between the BD signal and the FG signal stored in the ROM 601. With this configuration, it is possible to emit the light beam to the area where the BD signal is generated without exposing the photosensitive member 50. Accordingly, it is possible to prevent the marking back from occurring on the recording medium even when the charging bias and the developing bias are applied during the BD area light emission search sequence.

According to the embodiment, it is possible to identify the reflection surface of the rotary polygon mirror without causing the marking back to occur on the recording medium. The lighting-up timing of the light source for obtaining the synchronous signal can be determined based on the identified reflection surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083558, filed Apr. 15, 2014, which is hereby incorporated by reference herein in its entirety.

What is claimed is:

1. An image forming apparatus, comprising:
   a photosensitive member;
   a charging unit configured to charge the photosensitive member;
   a light scanning apparatus configured to emit a light beam to the photosensitive member to form an electrostatic latent image on the photosensitive member charged by the charging unit,
   wherein the light scanning apparatus comprises:
      a light source configured to emit the light beam;
      a rotary polygon mirror comprising a plurality of reflection surfaces configured to deflect the light beam emitted from the light source so that the light beam scans the photosensitive member;
      a light receiving unit arranged on a scanning route of the light beam in such a position as to receive the light beam that is emitted from the light source during a period other than a period during which the photosensitive member is scanned, and is deflected by the plurality of reflection surfaces, the light receiving unit being configured to generate a pulse for determining an emitting timing of the light beam based on image data in a scanning period of the light beam; and
      a drive unit comprising a motor configured to rotate the rotary polygon mirror and a pulse generating unit configured to generate a plurality of pulses in accordance with a rotation phase during one revolution of the rotary polygon mirror, a number of the plurality of pulses generated by the pulse generating unit being different from a number of pulses generated by the light receiving unit during one revolution of the rotary polygon mirror, each of the pulses generated by the pulse generating unit being generated between the respective pulses generated by the light receiving unit during one revolution of the rotary polygon mirror;

a developing unit configured to develop, by using toner, the electrostatic latent image formed on the photosensitive member by the light beam scanning the photosensitive member, the developing unit comprising a toner carrying member configured to carry the toner, the developing unit being configured to apply a voltage for developing the electrostatic latent image to the toner carrying member;

a storage unit configured to store phase relationship information between the pulses generated by the light receiving unit and the pulses generated by the pulse generating unit during one revolution of the rotary polygon mirror; and a control unit configured to control the light scanning apparatus and configured to identify an incident timing of the light beam, which is deflected by the rotary polygon mirror, incident to the light receiving unit, wherein the control unit controls the light scanning apparatus so that the rotary polygon mirror starts rotating and the light receiving unit receives a light beam deflected by the rotary polygon mirror which is rotating before the photosensitive member is charged by the charging unit and before the voltage is applied to the toner carrying member by the developing unit, and wherein the control unit identifies the incident timing when the light beam deflected by the rotary polygon mirror which is rotating enters the light receiving unit without exposing the photosensitive member after the charging unit starts charging the photosensitive member and after the developing unit starts applying the voltage to the toner carrying member, the incident timing being identified based on the phase relationship information and the number of the pulses generated by the pulse generating unit generated between the pulses generated by the light receiving unit.

2. An image forming apparatus according to claim 1, wherein the control unit comprises:
   a first counter configured to count the number of the pulses generated by the pulse generating unit generated between the pulses generated by the light receiving unit; and
   a second counter configured to count the pulses generated by the pulse generating unit in order to identify the number of the pulses generated by the pulse generating unit generated during one revolution of the rotary polygon mirror, and
wherein the control unit identifies, based on a plurality of count values output from the first and the second counters during one revolution of the rotary polygon mirror, the incident timing when the light beam during one scanning period of the light beam enters the light receiving unit after the charging unit starts charging the photosensitive member and after the developing unit starts applying the voltage to the toner carrying member.

3. An image forming apparatus according to claim 1, wherein the rotary polygon mirror comprises N reflection surfaces configured to deflect the light beam, and
wherein the pulse generating unit generates pulses having a number larger than N during one revolution of the rotary polygon mirror.

4. An image forming apparatus according to claim 3, wherein the rotary polygon mirror comprises four reflection surfaces configured to deflect the light beam, and
wherein the pulse generating unit generates five pulses during one revolution of the rotary polygon mirror.

5. An image forming apparatus according to claim 3, wherein the rotary polygon mirror comprises five reflection surfaces configured to deflect the light beam, and
wherein the pulse generating unit generates six pulses during one revolution of the rotary polygon mirror.

6. An image forming apparatus according to claim 3, wherein the rotary polygon mirror comprises four reflection surfaces configured to deflect the light beam, and
wherein the pulse generating unit generates six pulses during one revolution of the rotary polygon mirror.

7. An image forming apparatus according to claim 1, wherein the rotary polygon mirror comprises N reflection surfaces configured to deflect the light beam, and
wherein the pulse generating unit generates pulses having a number smaller than N during one revolution of the rotary polygon mirror.

8. An image forming apparatus according to claim 7, wherein the rotary polygon mirror comprises four reflection surfaces configured to deflect the light beam, and
wherein the pulse generating unit generates three pulses during one revolution of the rotary polygon mirror.

9. An image forming apparatus according to claim 7, wherein the rotary polygon mirror comprises five reflection surfaces configured to deflect the light beam, and
wherein the pulse generating unit generates four pulses during one revolution of the rotary polygon mirror.

10. An image forming apparatus according to claim 7, wherein the rotary polygon mirror comprises six reflection surfaces configured to deflect the light beam, and
wherein the pulse generating unit generates five pulses during one revolution of the rotary polygon mirror.

11. An image forming apparatus according to claim 7, wherein the rotary polygon mirror comprises eight reflection surfaces configured to deflect the light beam, and
wherein the pulse generating unit generates four pulses during one revolution of the rotary polygon mirror.

12. An image forming apparatus according to claim 7, wherein the rotary polygon mirror comprises eight reflection surfaces configured to deflect the light beam, and
wherein the pulse generating unit generates five pulses during one revolution of the rotary polygon mirror.

13. An image forming apparatus according to claim 7, wherein the rotary polygon mirror comprises eight reflection surfaces configured to deflect the light beam, and
wherein the pulse generating unit generates six pulses during one revolution of the rotary polygon mirror.

* * * * *